April 10, 1951  P. L. CHELLE  2,548,589
FILLING MACHINE FOR GASEOUS LIQUIDS
Filed Nov. 25, 1947  20 Sheets-Sheet 3

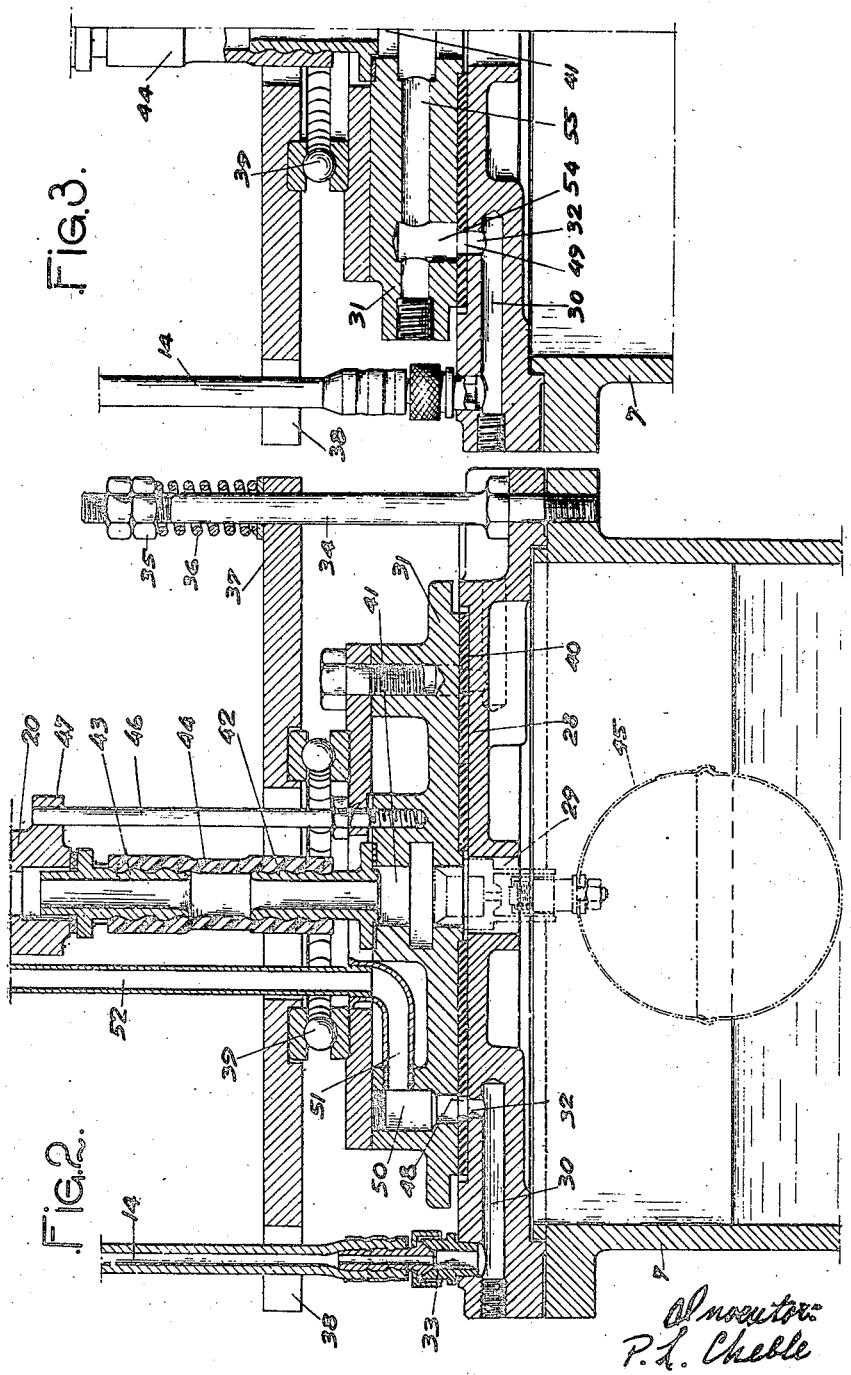

April 10, 1951   P. L. CHELLE   2,548,589
FILLING MACHINE FOR GASEOUS LIQUIDS
Filed Nov. 25, 1947   20 Sheets-Sheet 4

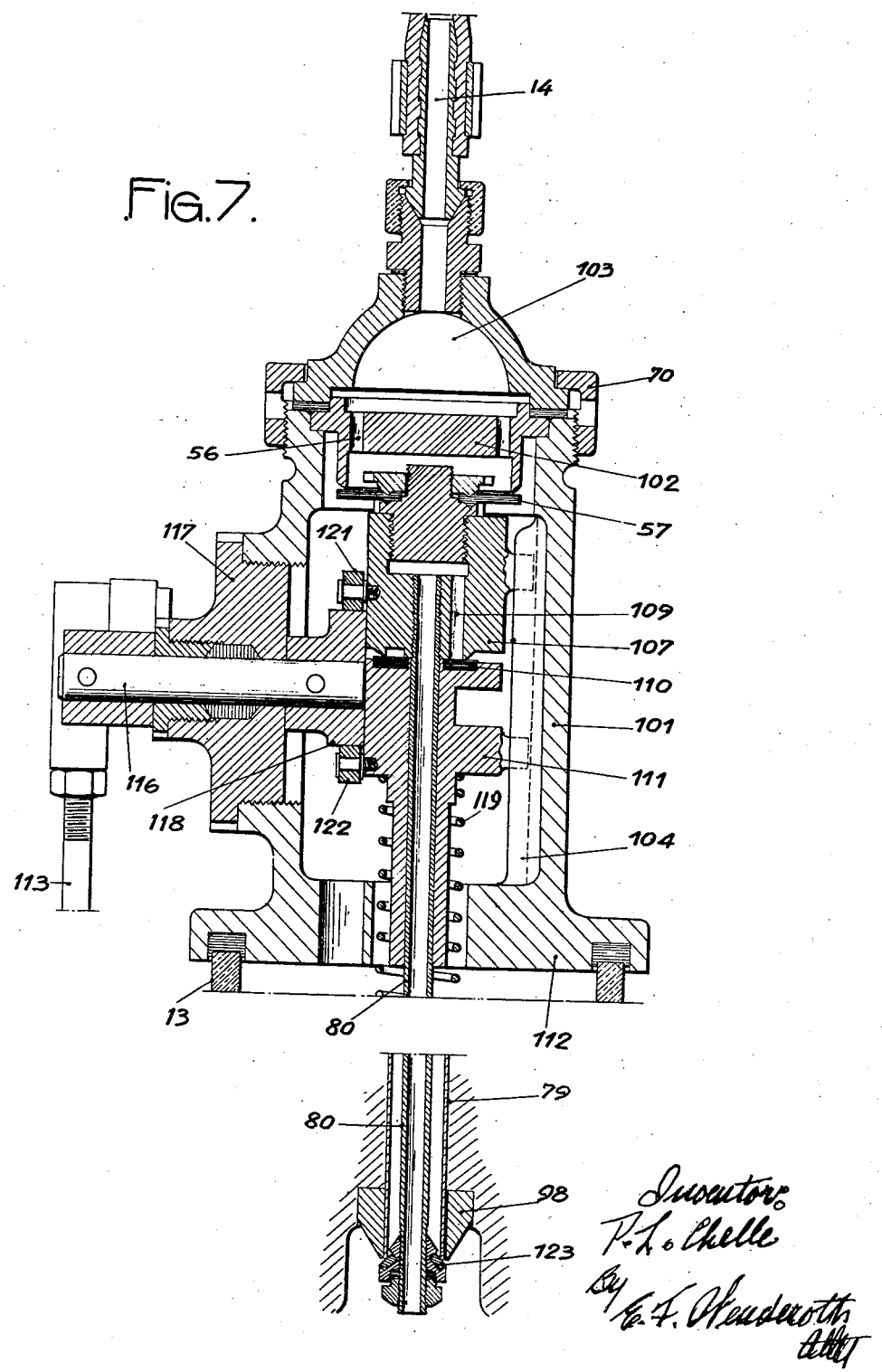

April 10, 1951 P. L. CHELLE 2,548,589
FILLING MACHINE FOR GASEOUS LIQUIDS
Filed Nov. 25, 1947 20 Sheets-Sheet 6
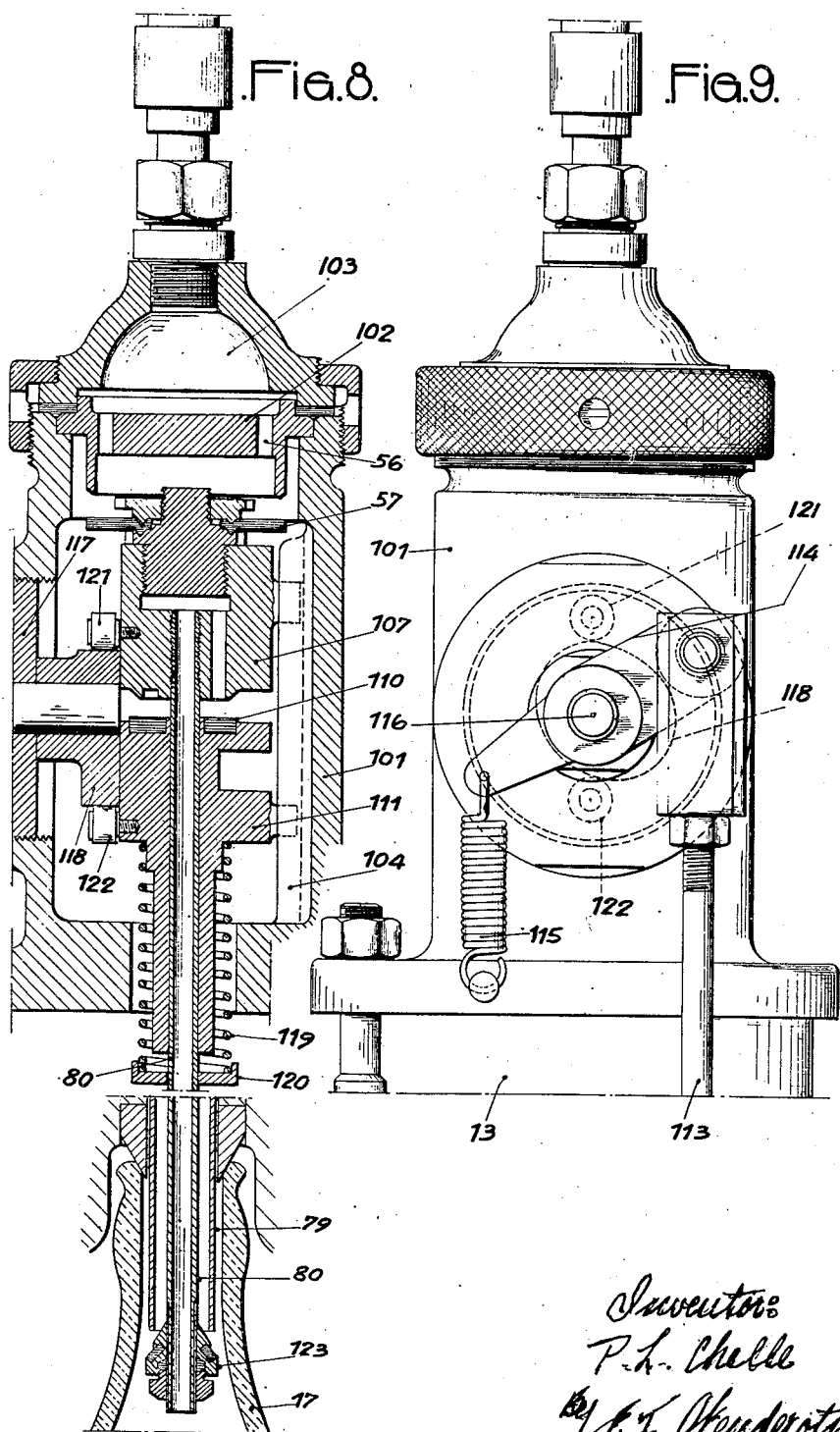

April 10, 1951 P. L. CHELLE 2,548,589
FILLING MACHINE FOR GASEOUS LIQUIDS
Filed Nov. 25, 1947 20 Sheets-Sheet 12
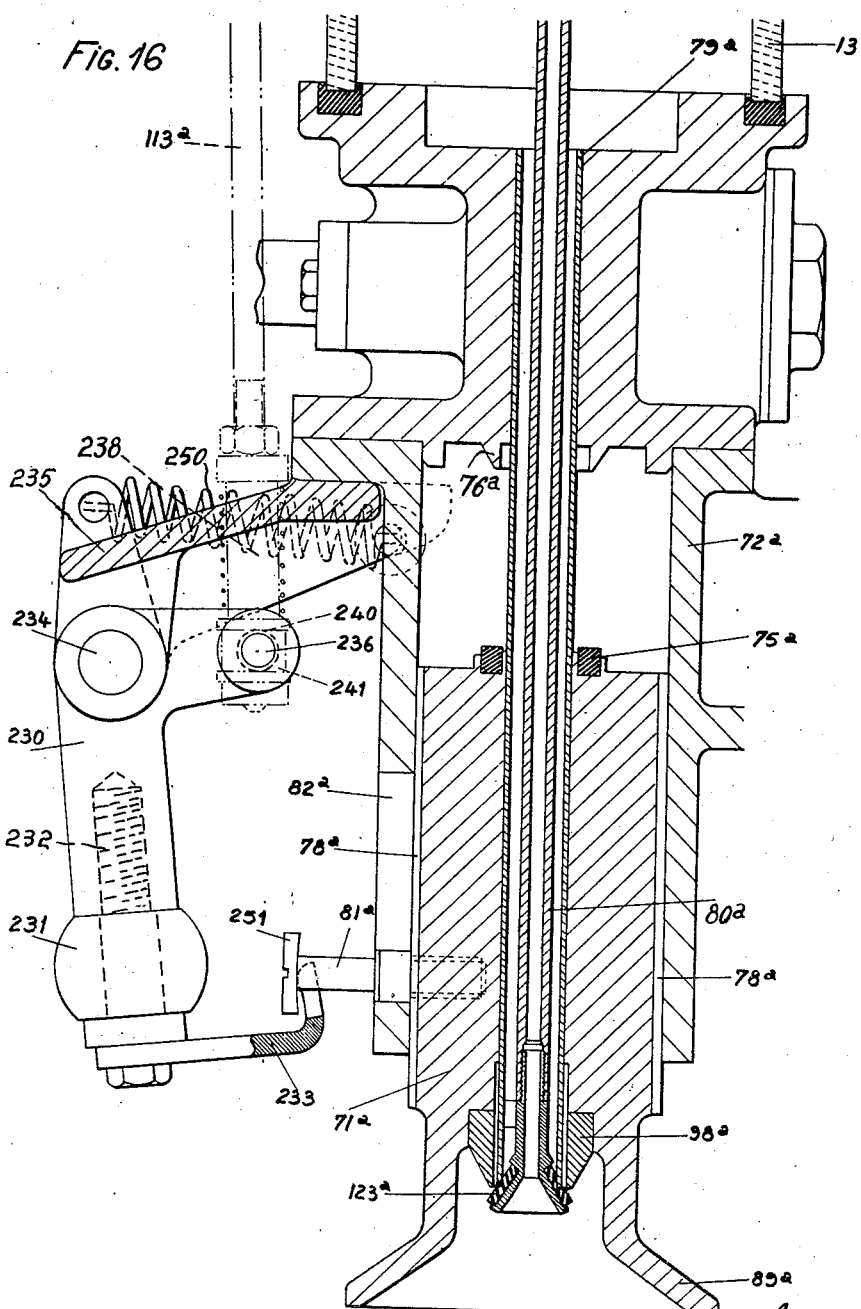
Fig. 16
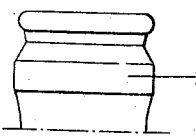
Inventor:
P. L. Chelle
By E. F. Wenderoth
Atty April 10, 1951 P. L. CHELLE 2,548,589
FILLING MACHINE FOR GASEOUS LIQUIDS
Filed Nov. 25, 1947 20 Sheets-Sheet 17

April 10, 1951 P. L. CHELLE 2,548,589
FILLING MACHINE FOR GASEOUS LIQUIDS
Filed Nov. 25, 1947 20 Sheets-Sheet 19

Inventor:
P. L. Chelle
By E. F. Wenderoth
Atty

April 10, 1951 P. L. CHELLE 2,548,589
FILLING MACHINE FOR GASEOUS LIQUIDS
Filed Nov. 25, 1947 20 Sheets-Sheet 20
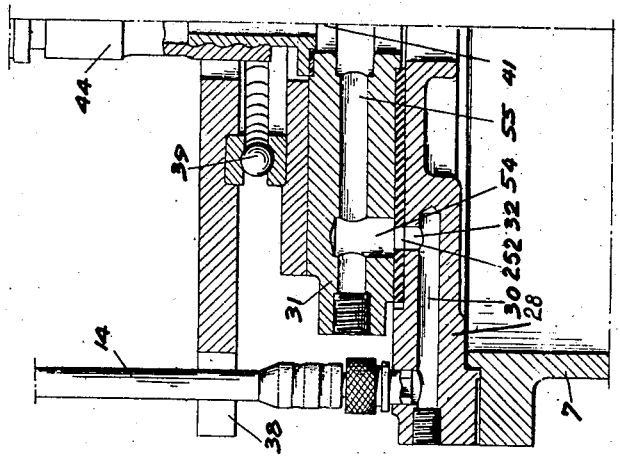
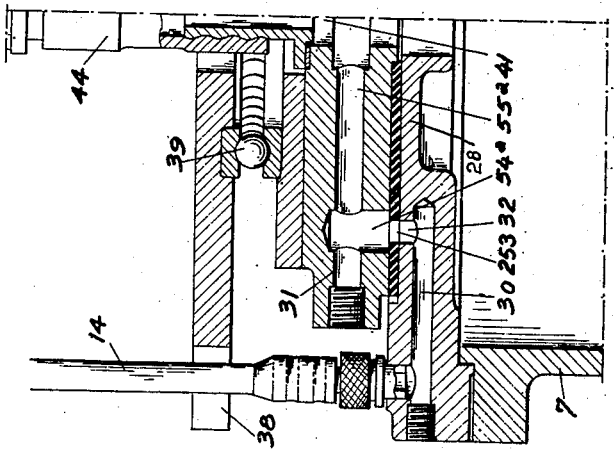
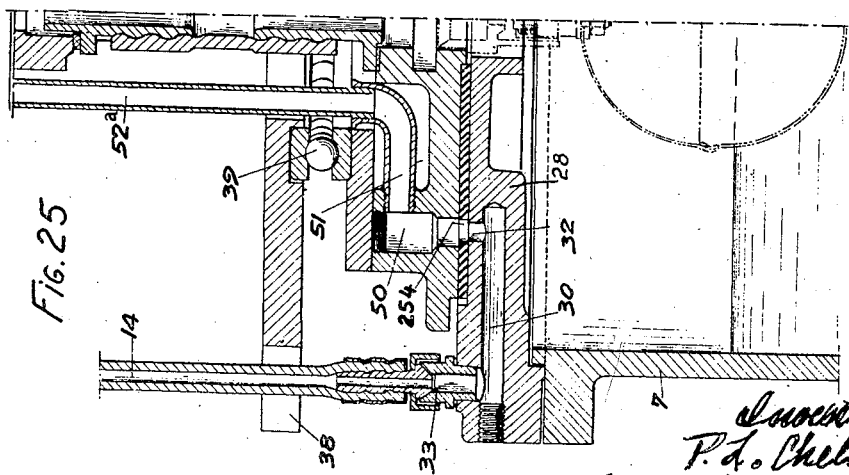

Patented Apr. 10, 1951

2,548,589

UNITED STATES PATENT OFFICE 2,548,589

FILLING MACHINE FOR GASEOUS LIQUIDS

Paul Louis Chelle, Alfortville, France

Application November 25, 1947, Serial No. 787,999
In France December 9, 1946

24 Claims. (Cl. 226—116)

The present invention relates to the racking of gaseous liquids; for this purpose, so-called "isobarometric" filling machines are already known, which are operative to establish in the bottle, prior to the delivery of liquid thereto, a gas pressure substantially equal to the pressure of the gaseous liquid contained in the tank of the filling machine, whereby said liquid may thereafter flow into the bottle simply under the action of hydrostatic pressure, with a minimum amount of whirling motion, any amount of turbulence favoring the degasification of the liquid.

In known isobarometric filling machines, the bottles are preliminarily connected in a gas-tight manner to a filler nozzle comprising a rubber fitting which isolates the bottles from atmospheric pressure. The filler nozzle contains two conduits, one of which is connected with the gaseous atmosphere in the tank, and the other with the liquid contained therein. The bottle is first placed under pressure by delivering gas thereto, then, as the liquid is flowing into the bottle, the gas and air mixture which the bottle thus contains is delivered into the atmosphere of the filling machine by a so-called "back-pressure" tube, which is if required completed by a third tube called "foam return" pipe.

The tank, or "collector" in such known filling machines contains a float which opens an exhaust tube communicating with the free atmosphere as soon as the liquid level drops in the collector as a result of the bottle being filled. At the same time as this opening vents the air originating from the bottles to the atmosphere, it generates in the collector a pressure drop which causes the suction of a fresh amount of liquid into the collector.

The main object of the present invention is to provide in a filling machine of the character described, intermediate containers which are interposed between the central collector and each filler nozzle, which are intermittently connected to the atmosphere of the collector, to the liquid therein and to the outer air through a central distributor. The filling operation is effected in two distinct and successive steps; firstly, the intermediate container is put under pressure and filled from the central collector, then the bottle is put under pressure and thereafter filled from the intermediate container which at that time is isolated from the central collector, while the atmosphere of the collector is prevented from being vitiated by the atmosphere of the bottle.

Another object of the invention is to provide in a filling machine of the character described, means for preventing of the vitiation of the collector atmosphere after the bottle is put under pressure, during the filling thereof by liquid, by delivering of the air and gas mixture contained in said bottle into the atmosphere of the intermediate container to thereinafter escape in the surrounding atmosphere.

This arrangement offers a two-fold advantage: On one hand, it eliminates the return of air from the bottle into the gaseous atmosphere of the central collector—which is highly important from a bacteriological standpoint, particularly in the racking of beer; secondly, it permits a strictly accurate pressure balance between the pressure of the bottle and that of the corresponding intermediate container throughout the filling operation, which is independent from the supply to the central tank.

Any foaming is thereby avoided in the liquid, since the latter is introduced into the bottle by normal transfusion from the related intermediate container, the molecular equilibrium conditions being strictly maintained uniform in the liquid throughout the operation.

Another object of the invention is to provide a filling machine of the character described, wherein each intermediate container is connected to the corresponding bottle through a straight vertical tube, for avoiding any loss of pressure through changes in direction.

The invention has for another object to provide a filling machine of the character described, wherein the blowing through of the air contained in the bottles is effected prior to the introduction of the liquid by subjecting said bottles to the action of a vacuum, the carbonic gas is thereafter introduced, at the filling pressure, into said bottles preliminarily evacuated and the liquid finally flows into said bottle in the presence of a pure gaseous atmosphere.

The invention has as a further object to provide a filling machine of the character described, wherein the placing of the intermediate container under a counter-pressure, the creation of a vacuum in the bottle, the placing of the bottle under a counter-pressure and the filling thereof with liquid, are carried out in succession through the agency of a system of operating check-valves connected with the intermediate container and controlled from a common cam, independent of the vertical height of the bottles, and the contour of which is so predetermined that said system of operating check-valves will successively produce the above described effect.

The invention has as another object to provide a filling machine of the character described, wherein the cam is correlated with a distributor comprising means operative to successively cause a communication from the gaseous atmosphere of the central collector to the atmosphere of each intermediate container, then direct communication from the bottle to a source of vacuum, then effect the communication of the evacuated bottle through the same conduit with the gaseous atmosphere of the central collector through the gaseous atmosphere of the intermediate container, while the communication from the latter to the central collector is cut off as soon as liquid starts to flow into the bottle. The fact that the bottle is placed in communicaion with the intermediate container and the central collector for a very short time, in order to place the bottle under a counter-pressure, averts the occurrence of a pressure drop which would manifest itself if the bottle is in communication merely with the gaseous atmosphere contained in the intermediate container. The filling machine so equipped, reduces gas consumption to a minimum, said consumption being restricted to the volume occupied by the gas in the upper chamber of the intermediate container, which may be gauged with accuracy, since it is now necessary only to drain the air from the bottle.

The invention has for an additional object to provide, in a filling machine of the character described, the disposition of the intermediate containers with a view to effect decompression in the bottle in several successive steps, thereby avoiding degasification of the liquid as a result of loss of balance due to a too sudden pressure change after filling.

The invention further includes other features which will appear from the following disclosure made with reference to the appended drawings illustrating some embodiments given by way of example and not of limitation, wherein:

Figures 2 and 3 illustrate the central distributor in cross-section on two different planes, according to the machine illustrated in Fig. 1.

Figures 7 and 8 illustrate in section the valve structure in two different positions, according to the machine illustrated in Fig. 1.

Figure 9 is an elevational view corresponding to Figure 7.

Figures 15 and 16 illustrate, in elevation and in cross-section and according to the machine illustrated in Fig. 12, the valve casing structure, the intermediate container and the distributing members for the bottle, in the position thereof corresponding to the establishment of a counter-pressure in the intermediate container.

Figure 24 shows the central distributor in half axial cross-section along the line O—XXIV of Figure 23, in the position thereof corresponding to the setting up of a counter-pressure in the intermediate container.

Figure 25 illustrates the central distributor in half-axial cross-section on line O—XXV of Figure 23, in the position corresponding to the creation of the vacuum in the bottle.

Figure 26 shows the central distributor in half-axial cross-section on line O—XXVI of Figure 23, corresponding to the setting up of a counter-pressure in the bottle.

Figure 1:
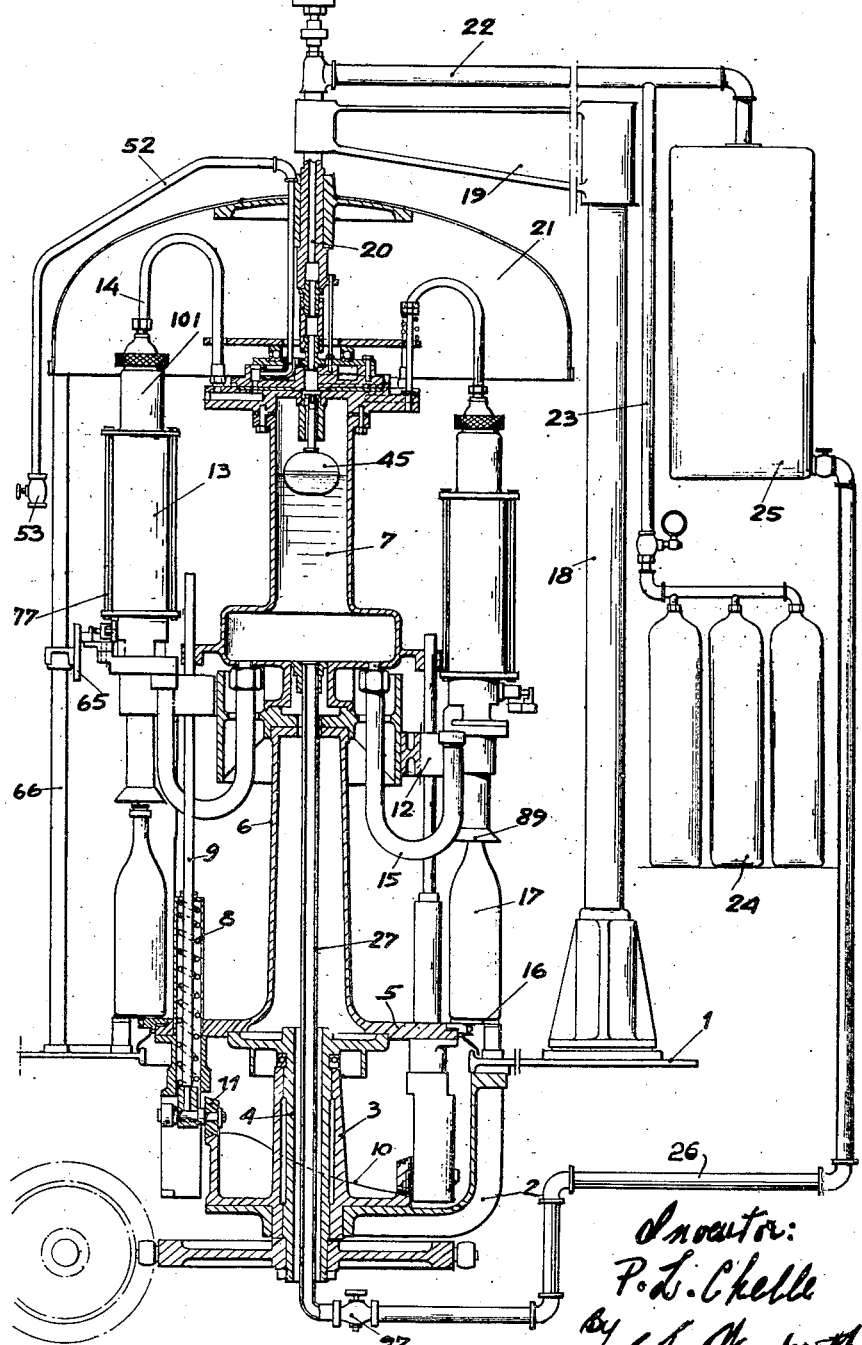
Figure 1 is a general view, in axial cross-section, of the filling machine comprising a means for blowing through of the bottle atmosphere by discharging same into the surrounding atmosphere.

The filling machine shown in Figure 1 comprises a base-plate 1 on which is supported a fixed bracket 2 rigid with a socket 3 in which is rotatably supported a hollow shaft 4 carrying a flange 5. Said flange 5 is rigid, on one hand, with a hollow pillar 6 which supports the central collector 7, and on the other hand, with a number of vertical guideways 8 in which rods 9 are slidable under the action of a circular cam surface 10 which they engage through follower rollers 11. Upon each of said rods 9, there is secured a clamping collar 12 supporting a filler nozzle surmounted by an intermediate container 13. The latter communicates with the collector 7 through an upper flexible pipe 14 and a lower flexible pipe 15. The rotary flange 5 further carries an annular support 16 upon which rest the bottles 17.

The base-plate 1 mounts a pillar 18, on an arm 19 of which is secured an axial tube 20 for the intake of carbonic acid gas, said tube in turn supports a fixed hood 21 covering the flexible tubes 14. A tube 23, connected with a set of carbonic acid gas containers 24, communicates with the tube 20 and with a saturator 25 through a tube 22. The liquid is conducted from said saturator, through a pipe 26, to a tube 27 passing axially of the shaft 4 and the pillar 6 to discharge into the bottom of the central collector.

The cover 28 of said collector (Figures 2 and 3) is formed with a central aperture 29 and radial ducts 30 opening on the outer upper surface of said cover through ports 32 spaced along a circle concentrical with the collector. Said cover forms a planar slide-surface, or port-face, for a fixed distributor 31. The opposite end of each of said ducts 30 communicates with the flexible tube 14 of one of the filler nozzles through a removable union 33. Rotation of the distributor 31 is prevented by a pin 46 secured thereto and engaging a slide-way 47 pertaining to the tube 20.

The bolts 34 which serve to secure the cover 28 on the collector 7 are extended upwardly and are provided at their upper end with nuts and block-nuts 35 which act as abutments for coil springs 36 exerting downward pressure upon a circular plate 37 mounted on the bolts 34 and formed with recesses 38 for allowing the passing of the flexible tubes 14. Said plate transmits the pressure from the spring 36 to the distributor 31 by means of a ball thrust bearing 39.

The distributor 31 (Figures 2 and 3) is formed by a circular plate applied under pressure, as just disclosed, against the port-face formed by the top of the cover 28 with the interposition of a flat annular packing 40 made of fibre for instance. It comprises a central passage 41 upwardly extended by a branch 42 connected with a branch 43 downwardly extending the tube 30 through a flexible bushing 44. The assembly 20—43—44—42—41—29 forms a continuous path of travel from the gas containers 24 to the atmosphere in the collector 7 (Fig. 1); said path may, if required, be controlled by a valve provided with a float 45 responsive to the liquid level in the collector and opposing with a further rise of said liquid when the pressure of the latter increases excessively with respect to that of the carbonic acid gas.

Figure 4:
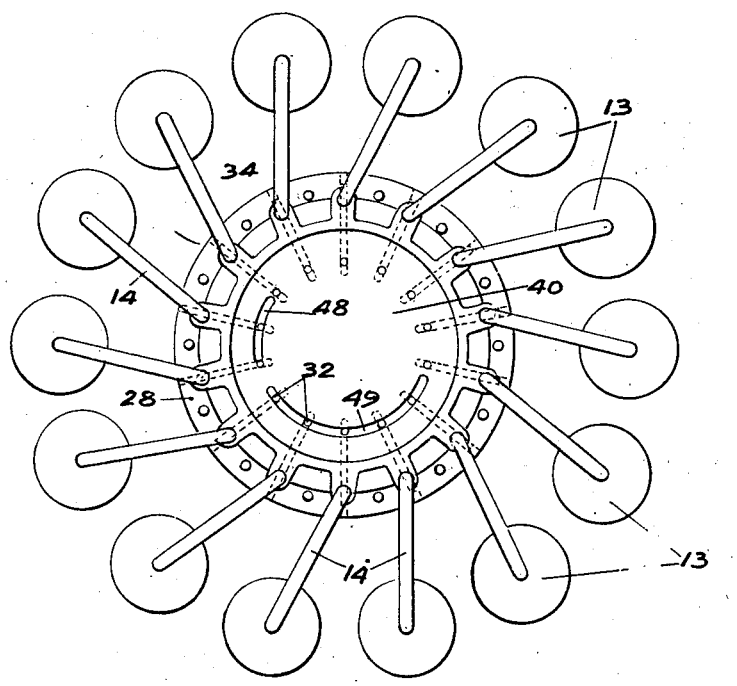
Figure 4 is a plan view of the distributor and the intermediate containers, according to the machine illustrated in Fig. 1.

The disk 40 is formed with two arcuate slots 48 and 49 of similar radius to that of the circle along which are distributed the ports 32 of the cover 28 (Figure 4). The slot 48 communicates through a channel 50 and a tube 51 mounted in the distributor 31 with a vent pipe 52 terminating in a needle valve 53 (Figures 1 and 2). The slot 49 communicates through channels 54 and 55 provided in distributor 31 with the carbonic acid gas delivery pipe 41 (Figure 4).

Each flexible tube 14 communicates with the atmosphere of the related intermediate container 13 by means of a valve casing 101 (Figures 7 and 8). Each flexible tube 15 communicates with the base of the container 13 through a channel 58 controlled by a valve 59 (Figures 5 and 6), the stem 61 of which is horizontally slidable in a lower valve seating 60 of the container 13; a coil spring 62 constantly urges said valve to closed condition. The valve stem 61 terminates in a yoke 63 which carries a follower roller 64, rotatable on a vertical axis and which cooperates with a cam-way 65 secured on a pillar 66 rigid with the base 1 for opening the valve in opposition to the action of spring 62. The location of the cam-way 65 with respect to the base 1 is so chosen that, in the absence of any bottle, the roller 64 is out of engagement therewith so that the valve 59 remains closed (position indicated in dotted lines in Figure 5).

The intermediate container comprises a cylindrical glass side-wall 13 clamped, with interposition of packings, between the valve seating 60 (Figure 5) and the valve casing 101 (Figure 7), by means of bolts 77 (Figure 1).

As shown in Figures 7 to 9, the valve casing 101 surmounting the intermediate container 13 is subdivided, by a partition 102, into two superposed chambers 103 and 104 adapted to communicate with one another through channels 56 provided in the partition 102. The upper chamber 103 constantly and freely communicates with the flexible tube 14, and the lower chamber 104 with the intermediate container 13. The channels 56 are controlled by a valve 57 formed by a resilient membrane, the periphery of which is free, and which is carried by a head 107 integral with the end of a back-pressure tube 80. Channels 109 provided in the head 107 enable the tube 80 to communicate with the chamber 104 when they are not closed by the packing 110 of a check-valve 111 slidable along the tube 80 in a bore of the valve casing 101.

The vertical sliding movements of the head 107, on one hand, and of the check-valve 111, on the other hand, are produced by the action of the bottle upon the funnel. This action is manifested, in a manner to be described later, by the lowering of a link 113 pivoted to a crank-arm 114 in opposition to the action of a return spring 115 (Figure 9). The crank-arm 114 is secured on a transversely extending shaft 116 which extends in a tight manner, through a plug 117 of the valve casing 101 (Figure 7). Within the chamber 104, a cam 118 is secured to shaft 116 which cooperates with two follower rollers 121 and 122 carried by the head 107 and the check-valve 111, respectively. A spring 119 is pressed at one end against said check-valve 111, and at the other end against a flange 120 secured on the tube 80 so as to maintain at all times the follower rollers 121 and 122 in engagement with the cam 118.

When no bottles are present beneath the funnel, the contour of the cam 118 is such that the check-valve 111 seals the channel 109 and thereby cuts off communication between the atmosphere of the intermediate container 13 and the tube 80. Moreover, the membrane 57 is very closely spaced from the opening of the channels 56 so that any excess pressure in chamber 103 with respect to chamber 104 enables the gas to flow, by virtue of the flexibility of the membrane, whereas in the event of an excess pressure in chamber 104, the gas is unable to flow into chamber 103.

The lower valve seating 60 (Figure 10) is downwardly extended by a hollow cylindrical body 72 within which is vertically slidable an upper projection 71 integral with the funnel 89, which is constantly urged to depressed position by a spring 74. Grooves 78 are formed in the outer surface of the projection 71.

The funnel 89 further is integral with a central tube 73 (Figure 10) in which is slidable a tube 79 and which is provided with a packing 75 for abutment against an annular bearing 76 of the valve seating 60. Said central tube 73 carries an outer lug 81 (Figure 11) which extends through a vertical slot 82 formed in the cylindrical body 72 and is adapted to engage outwardly the nose 83 of a lever 84 pivoted on a shaft 85 rigid with the body 72. It is this lever, pivoted at 86 to the link 113, which causes the rotation of the cam 118 at the end of the upward travel of the funnel 89 (Figures 7 to 9).

Figure 10:
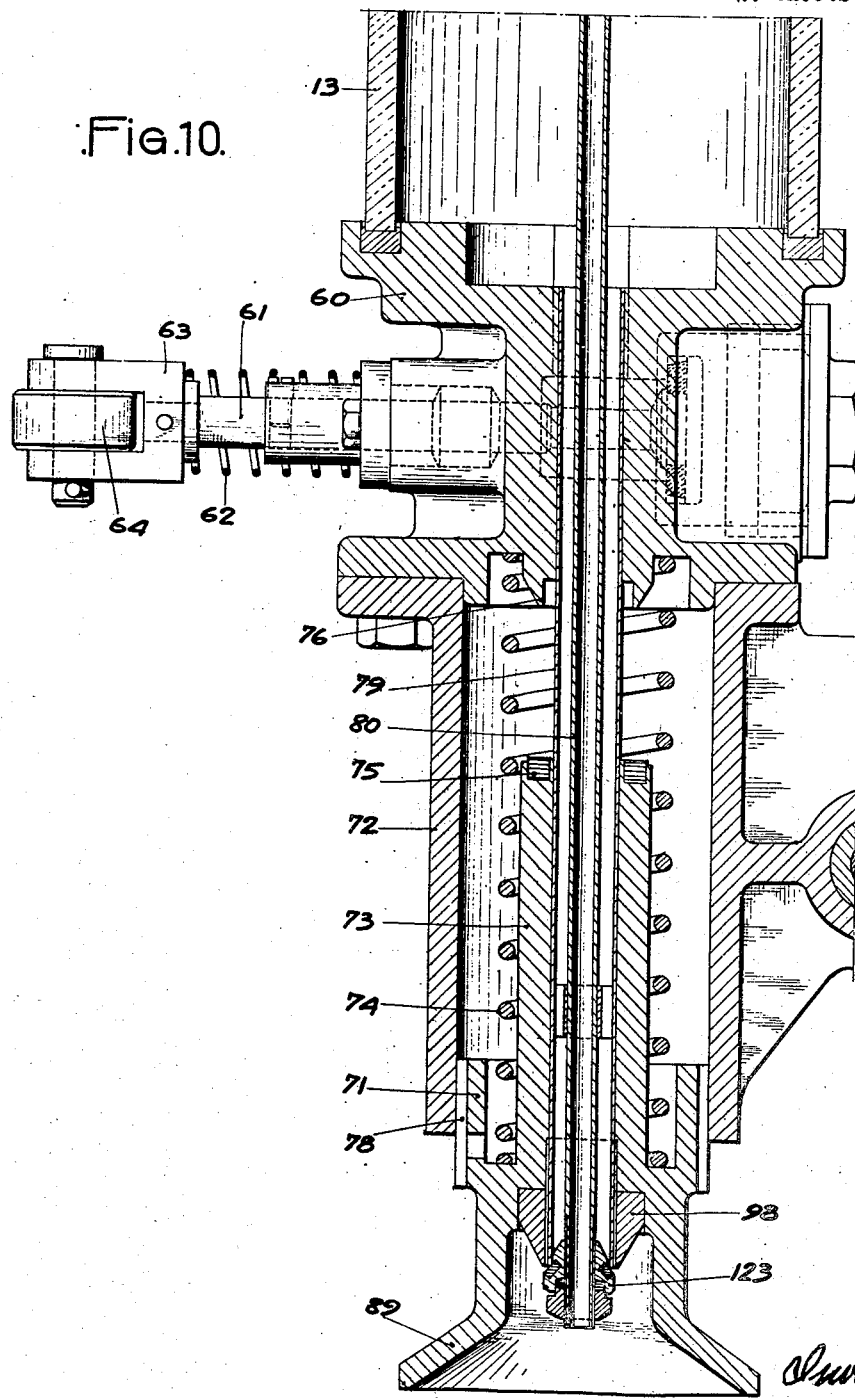
Figures 10 and 11 show in vertical cross-section and in elevation the filler nozzle, according to the machine illustrated in Fig. 1.
Figure 11:
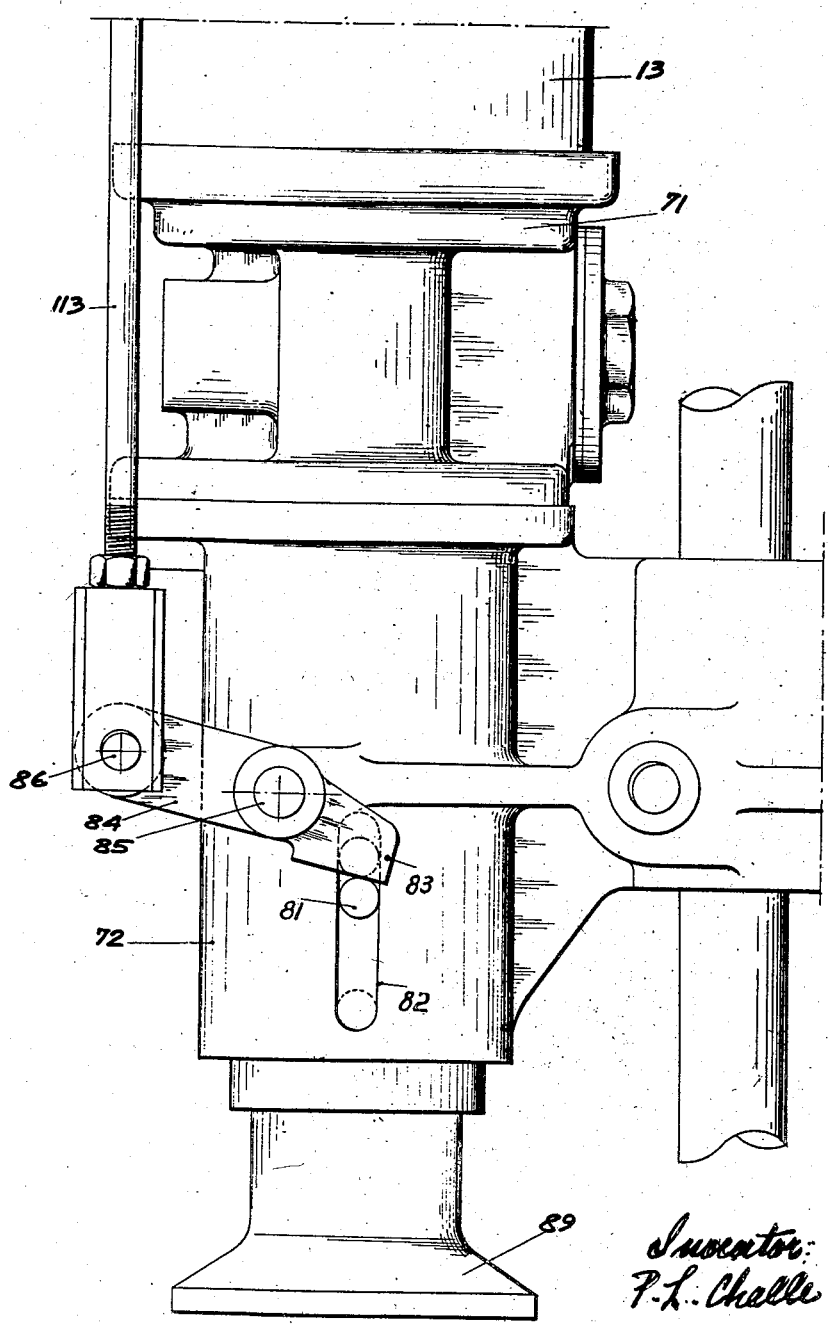

At its lower end, the tube 80 carries a conical closure member 123 which, when no bottle is present, closes the annular aperture between the tubes 79 and 80 (Figures 7, 8 and 10).

The operation of the filling machine arranged as described so far, and the operative process, are as follows:

When the machine is put into operation, the central collector 7 and the intermediate containers 13 are filled with air. The supply valve 97 controlling the pipe 27 being closed, the pressure of carbonic acid gas is delivered into collector 7 and the machine is set into rotation (Figure 1). The mixture of gas and air contained in the collector 7 passes, through the action of distributor 31

(Figures 2 and 3) and check-valve 57 (Figure 8), into the various intermediate containers 13 where it is mixed with the air contained in said containers, after which it is vented to the surrounding atmosphere provided that bottles are allowed to pass idly through the machine to enable the collector 13 to be blown through by means of the lowering of check-valve 57 resulting from the upward movement of the funnel 89. At each revolution, the concentration of carbonic acid gas in the atmosphere of containers 7 and 13 increases, so that by the end of a few revolutions, said containers are filled with pure carbonic acid gas at a pressure determined by the pressure reducing valve of the bottles 24.

Figure 5:
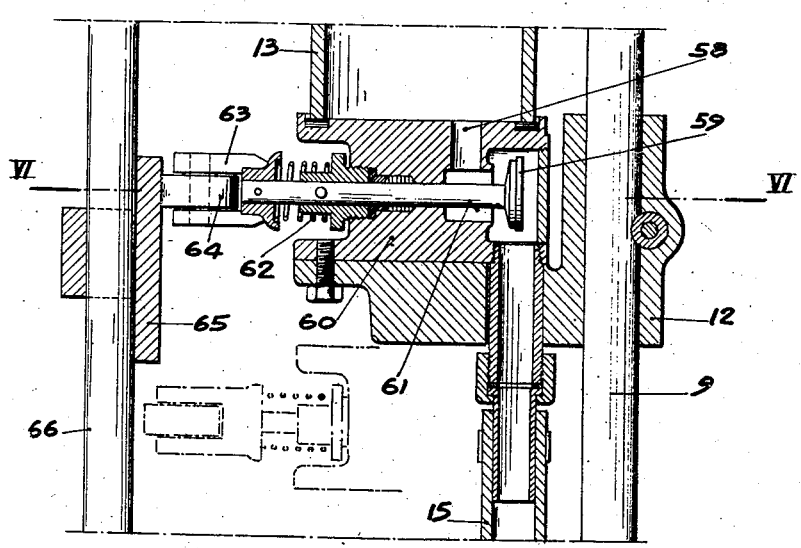
Figure 5 is a plan view of the device for controlling the lower valves of said containers, according to the machine illustrated in Fig. 1.
Figure 6:
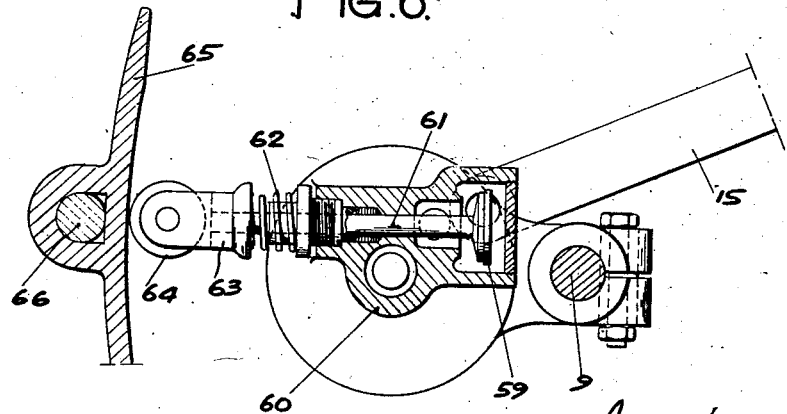
Figure 6 is a section on line VI—VI of Figure 5.

At that moment, the needle valve 53 is closed, and the liquid intake valve 97 is opened (Figure 1). The liquid from the saturator 25 rises in the collector 7 up to a level determined by the balance between the carbonic acid gas pressure in the collector and the pressure of the liquid at said level. As a result of the rotation of the filling machine, the valves 59 of the various intermediate containers 13 are successively opened under the action of the cam-way 65 so that in each of said containers the same level of liquid is established as in the collector 7 (Figures 5 and 6). With a view to enabling the liquid to flow from said collector into each container 13 without foaming, the connection between the atmosphere of collector 7 and that of the container 13 is established by the distributor 31 (by way of channels 29, 55, 54, slots 49 and conduits 32, 30, 33 and 14) (Figures 2 and 3) a short time before the valve 59 is opened in order to allow the pressure values to be equalized.

The valve 53 is now opened and the empty bottles are introduced into the machine for filling (Figure 1). When a bottle 17 acts upon the centering funnel, rotation of the shaft 116 and the cam 118 first causes lowering of the check-valve 111, thereby opening of the channels 109, the effect of which is to connect the bottle 17 with the gaseous atmosphere of the intermediate container 13. Rotation of the cam 118 thereafter causes downward movement of the head 107 and the tube 80, so that the closure member 123 disengages the liquid outlet, and the liquid flows in a conical jet. Simultaneously the check-valve 57 is opened so that evacuation of the chamber 104 and the intermediate containers 13 is made possible in the presence of a bottle, and only at such time, which avoids any superfluous loss of carbonic acid gas (Figure 8).

As soon as filling has begun, the intermediate container 13 is isolated from the collector 7 by the sealing of the slot 49 (Figures 3 and 4) and closure of the check-valve 57 (Figure 7). The air contained in the bottle is therefore prevented from vitiating the atmosphere of collector 7 and accumulates in the atmosphere of the container 13. When the slot 48 of the distributor comes into register with its related port 32 (Figures 2 and 4), the mixture of air and carbonic acid gas contained in the container 13 after completion of the filling of the bottles is vented to the surrounding atmosphere through the adjustable needle valve 53 (Figure 1) and is replaced by carbonic acid gas from the atmosphere of collector 7. The fact that the setting of the valve 53 ensures total evacuation of air from the bottles is checked by observing that the level of the liquid remains constant in the collector 7.

Decompression in the bottle after having been filled is accomplished in several successive steps in order to avoid degasification of the liquid contained therein; Firstly, the slot 48 of the distributor causes evacuation of the container 13 through the pipe 52 a short time before the filler nozzle is moved up again (Figure 2), this automatically producing a first decompression in the liquid in the bottle before the closure member is again lowered. A second decompression step is obtained during the upward movement of the nozzle, the neck of the bottle remaining in constant engagement therewith, through the play existing between the tube 79 and the packing 98 and through the channels 78 (Figure 10). A third step results from the enlargement of the gas chamber in the bottle due to the rising of the nozzle. Finally, pressure-relief is completed under atmospheric pressure as the nozzle is restored to its uppermost position.

In the event of there being no bottle under the funnel 89, neither liquid nor gas will issue from the container 13.

It is to be noted that the very simple arrangement of the filler nozzle facilitates cleaning thereof. Namely, it is simply necessary to unscrew the closure member 123 and the plug 117, to remove the cam 118 and to unscrew the assembly nut 70; the entire piping 79—80 may then be wholly removed from the apparatus together with the valves (Figure 7).

Figure 12:
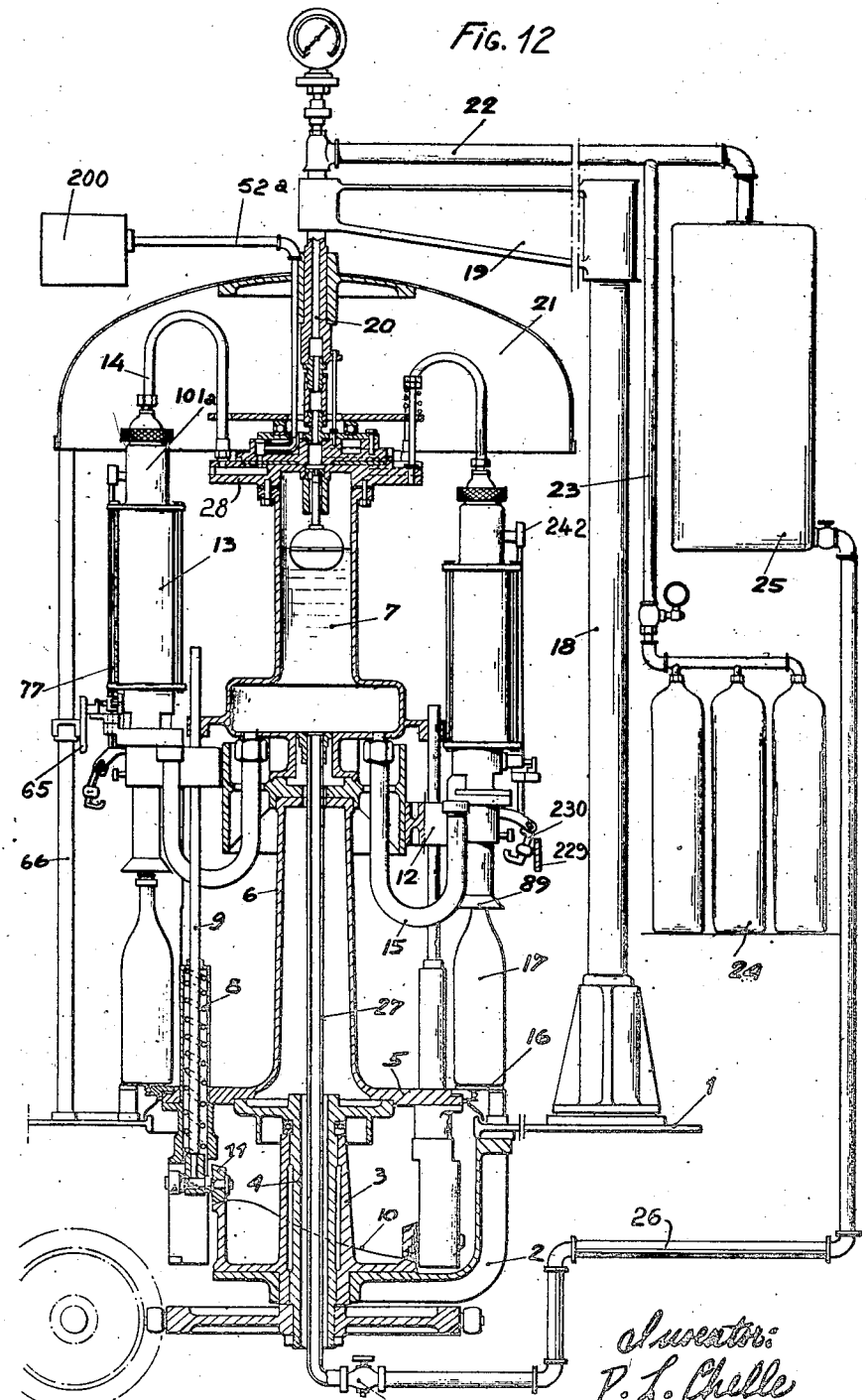
Figure 12 shows, in axial cross-section, the general assembly of a filling machine according to the present invention, wherein the blowing through of the bottle atmosphere is effected by subjecting said bottle to the action of a vacuum.

The automatic pressure filling machine for gaseous liquids illustrated in Figure 12, comprises a central collector 7, a series of intermediate containers 13 connected at their bottom with the liquid contained in the central collector through the agency of check-valves controlled from a circular cam 65 rigid with the stationary frame of the machine, the internal atmosphere in said containers being connected with the internal atmosphere of the central collector through a valve-casing 101a (Figure 13), and a distributor providing for the interconnection of the internal atmosphere in the central collector 7 and each of the intermediate containers 13, for the creation of a vacuum in the bottle from a vacuum pump 200 and for the setting up of a counter-pressure in the bottle 17.

The valve casing 101a (Figure 15) which surmounts the intermediate container 13 includes a piston 201 provided at its top with resilient valve members 202 and 203 which are free at their periphery and are clamped by means of nuts 204 and 205. The valve member 202 bears against a guide member 206 formed with holes 207 and secured to the top of the valve casing 101a by means of a nut 70a which also maintains the upper chamber 103a. The latter is connected through flexible tubes 14 with the cover 28 of the central collector (Figure 12).

Inside the piston 201 there is slidably mounted a bushing 208. The top of said bushing has threadedly connected therewith a bell-like member 209 locked by a nut 210 formed as a cup; in said cup there is housed a ball 211 the upward movement of which is restricted by means of a pin 212. The bottom of the bushing 208 carries a flange 213 rigidly connected with said bushing through any suitable means, as through soldering for instance, and which has threadedly connected therewith a check-valve 214 provided with a pair of concentric valve-seats 215 and 216 limiting an internal chamber 217. Ports 218 connect the chamber 217 with the counter-pressure tube 80a which further serves for creating a vacuum in the bottle.

The check-valve 214 is slidably mounted in the piston 201, as well as a flange 219 provided with a seal 220 bearing against the valve-seats 215 and 216, said flange being applied against the check-valve 214 by a spring 221 which is abutted against a ring 222 soldered to the tube 80a.

Figure 15:
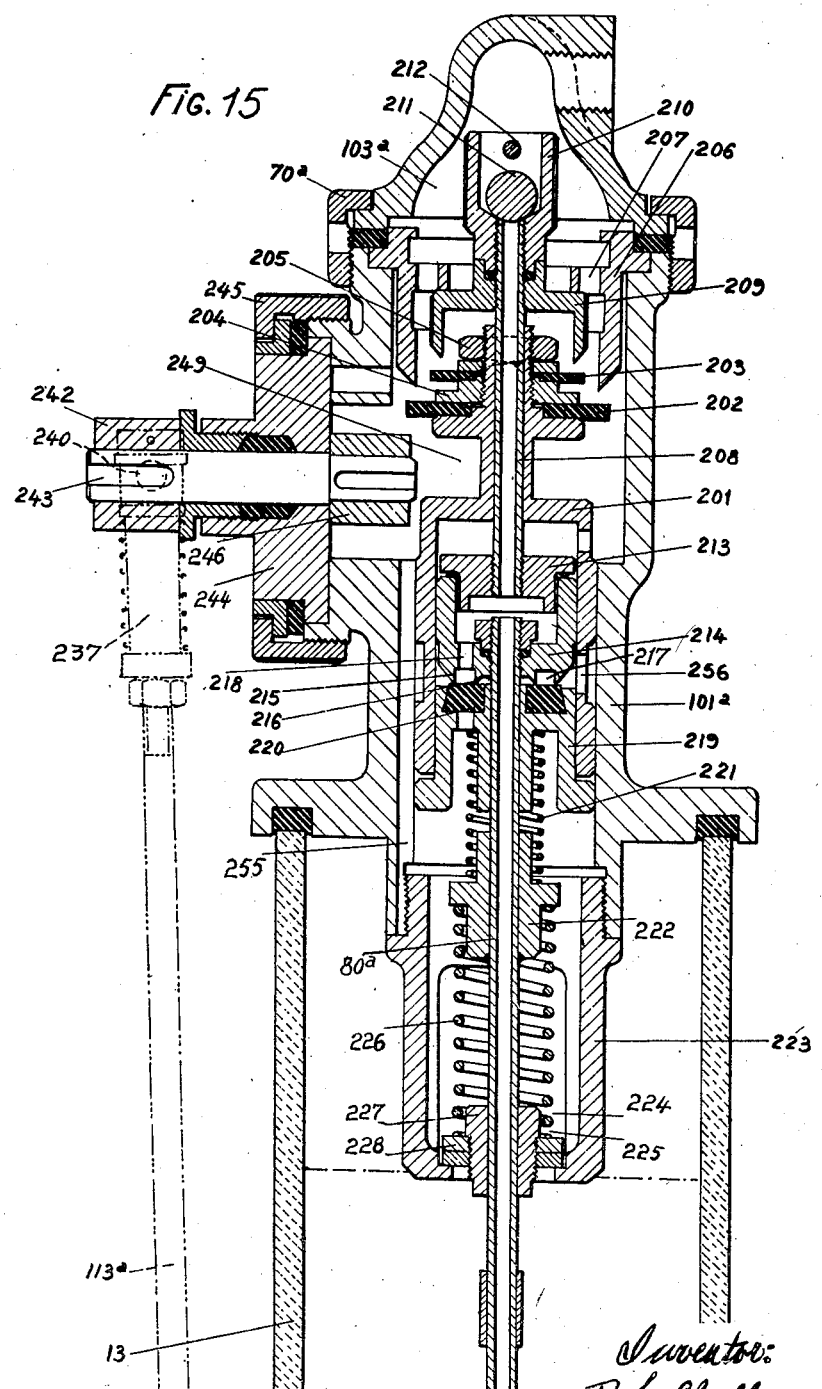

At the bottom of the valve casing 101a there is threaded a bushing 223 laterally formed with openings 224 and 225 providing communication from said bushing to the interior of the container 13. A spring 226 mounted inside the bushing 223 is supported at one end against the ring 222 soldered to the tube 80a and at the opposite end against a nut 227 and a washer 228 sealing the bushing 223. The spring 226 urges the closure plug 123a to closed position (Figures 15 and 16).

Figure 13:
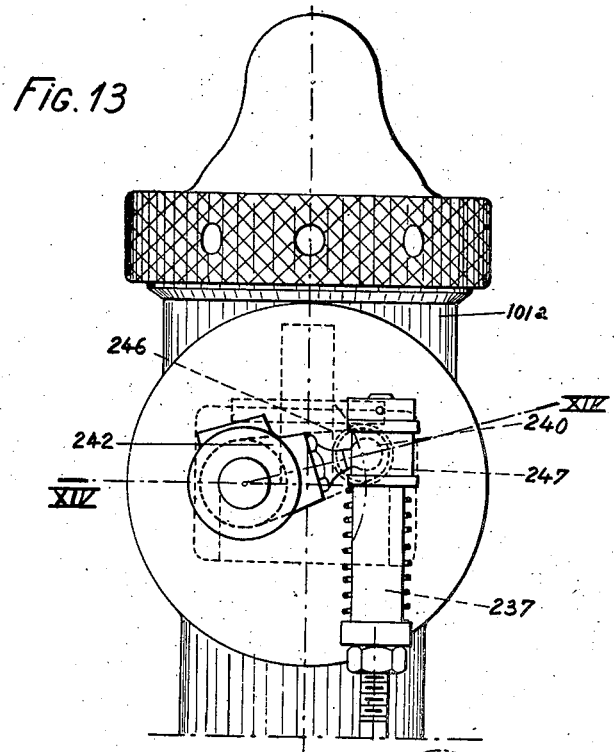
Figure 13 shows in elevation the device for controlling the check-valves in the valve casing structure, according to the machine illustrated in Fig. 12.
Figure 14:
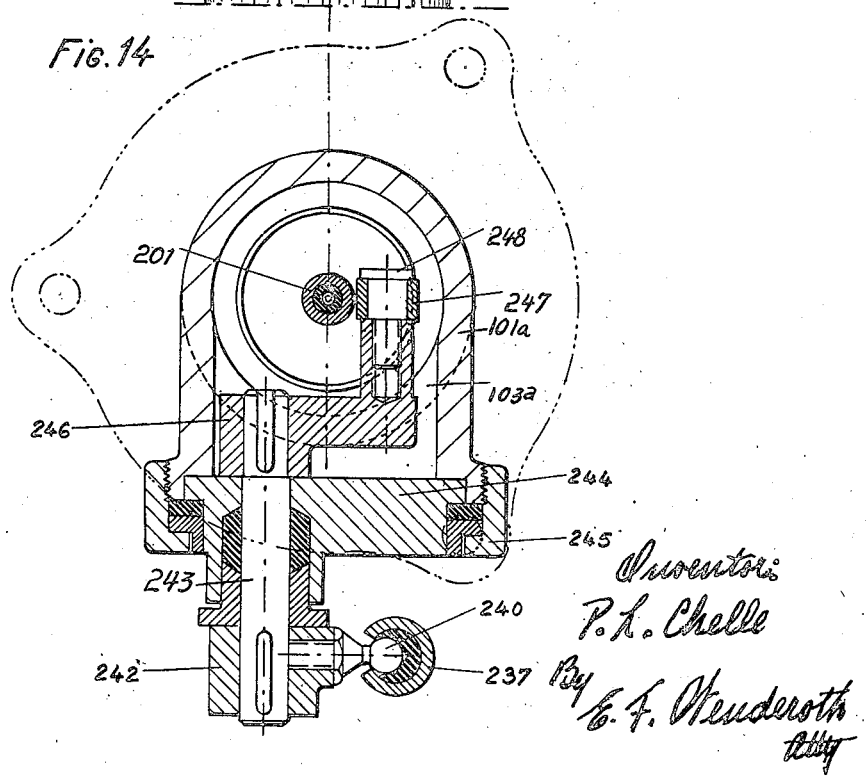
Figure 14 is a view in plan and partly in cross-section on line XIV—XIV of Fig. 13.

Opening and closure of the check-valves 202, 203 and 220 is controlled through the agency of a circular cam structure 229 including three cam-ways A, B and C (Figures 12 and 23) acting on a bell-crank lever 230 provided with a spherically shaped roller 231 journalled on a spindle 232 terminating in a fork portion 233 and pivoted on a pin 234 supported by a yoke member 235 rigid with the intermediate container 13 (Figure 16). The free arm of the bell-crank lever 230 is pivoted at 236 to a link 113a terminating at both ends thereof in spherically shaped bushings 237 and 238 in which are journalled ball members 239 and 240 respectively secured on the shank 241 of the lever 230 (Figure 16) and on a lever 242 keyed on a shaft 243 journalled in a ring 244 carried by the head of the valve-casing 101a and blocked by a nut 245 (Figures 13 and 14).

The inner end of the shaft 243 has keyed thereon a lever 246 (Figure 14) carrying at its end a roller 247 pivoted on a pin 248; said roller 247 engages a groove 249 (Figure 15) of the piston 201 and thus controls the various positions of the members.

A release spring 250 urges the spherical roller 231 into engagement with the cam 229 (Figure 16).

Figure 18:
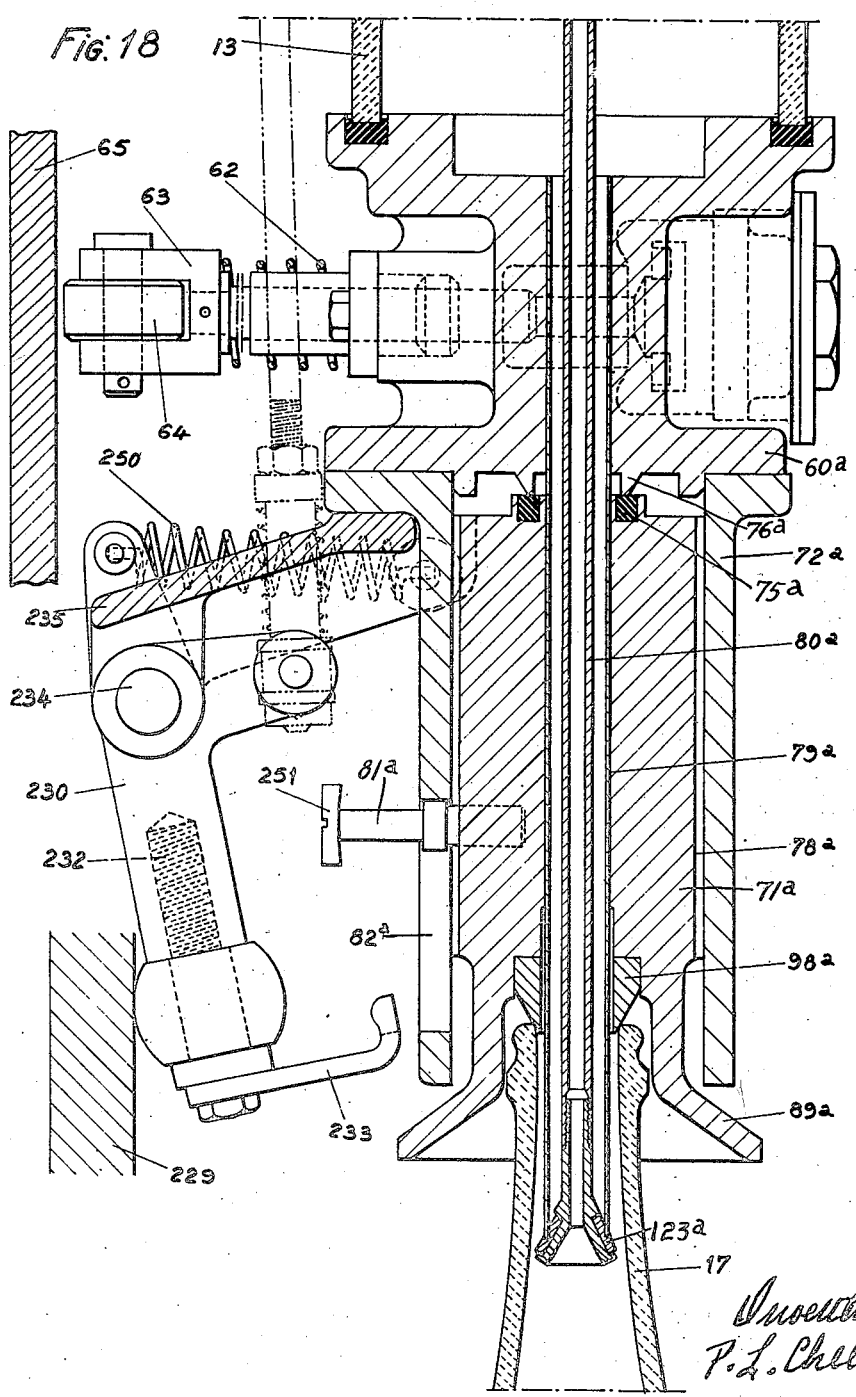
Figure 19:
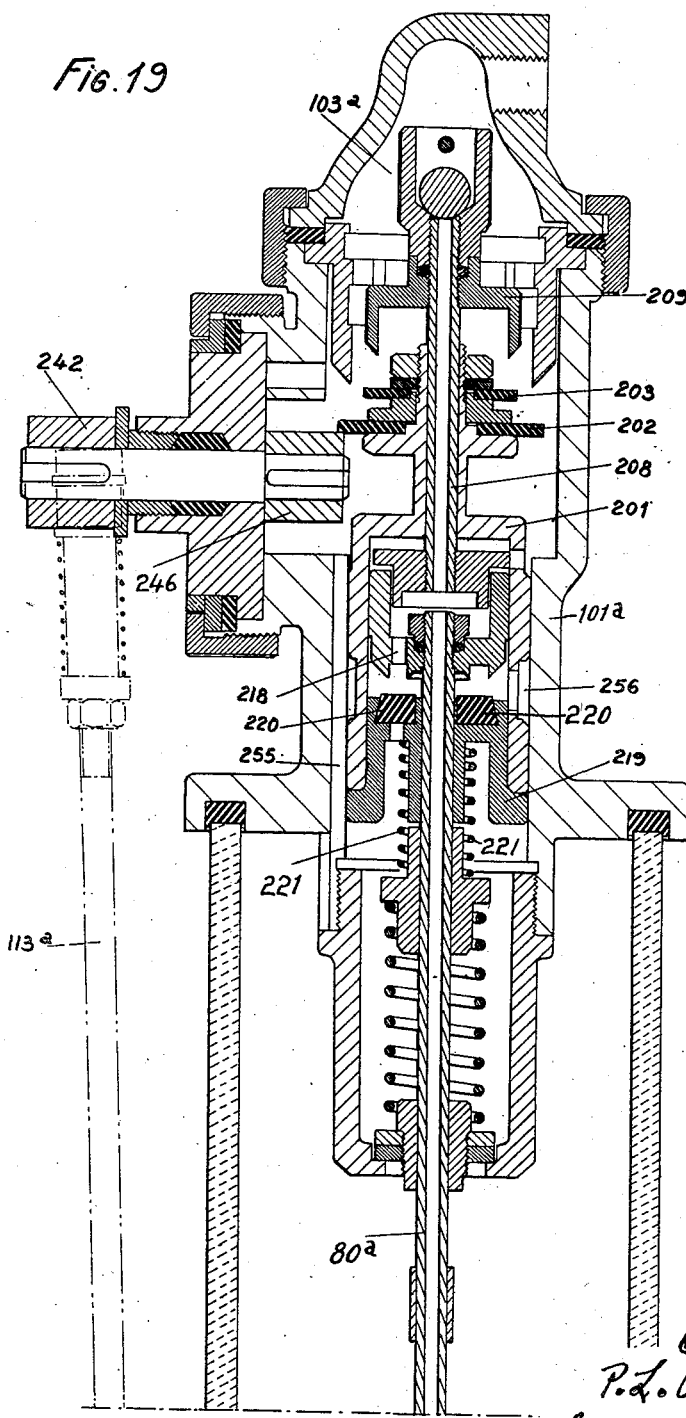
Figures 19 and 20 are similar to Figures 15 and 16 in the position corresponding to the establishment of a counterpressure of gas in the bottle.
Figure 20:
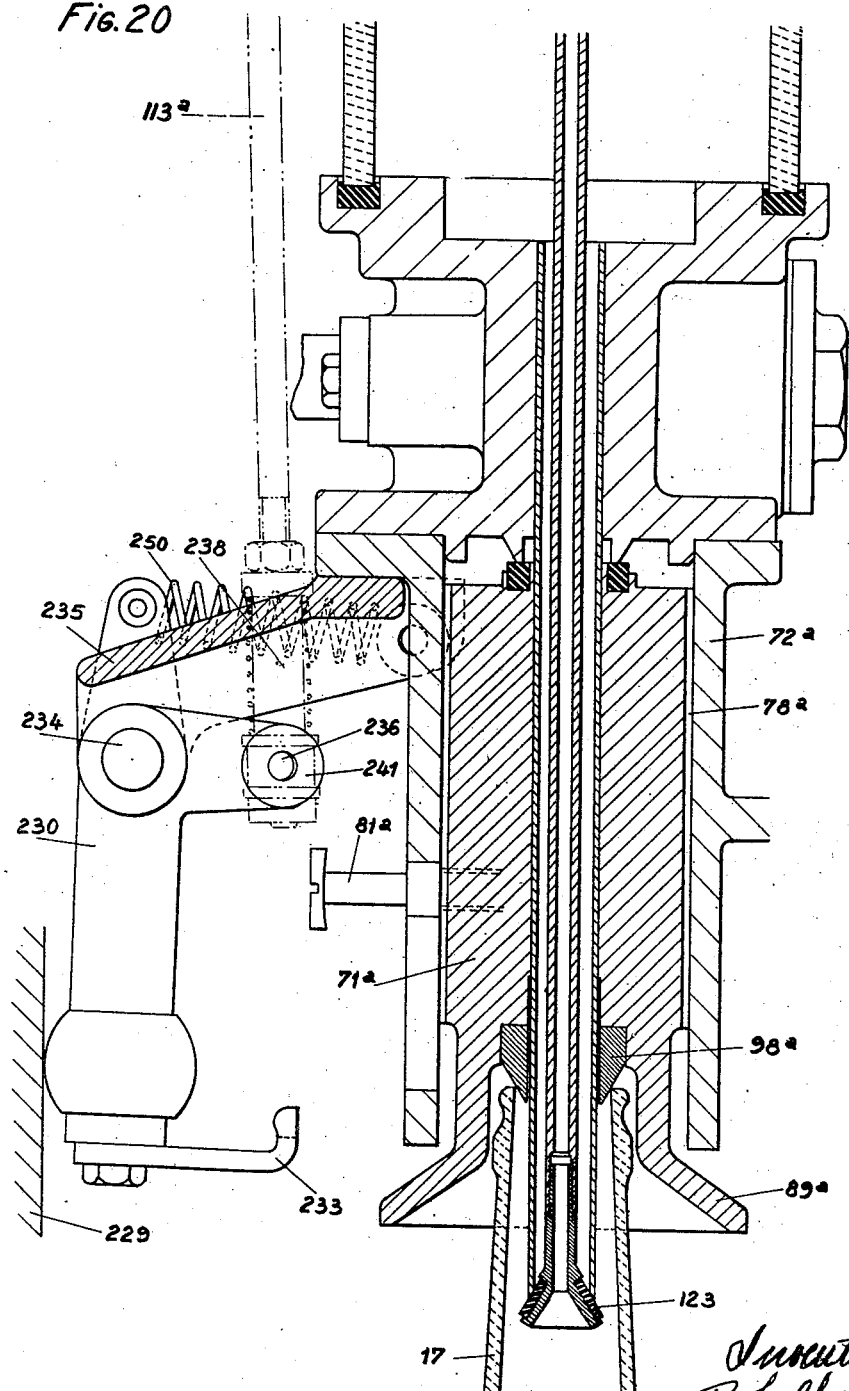
Figure 21:
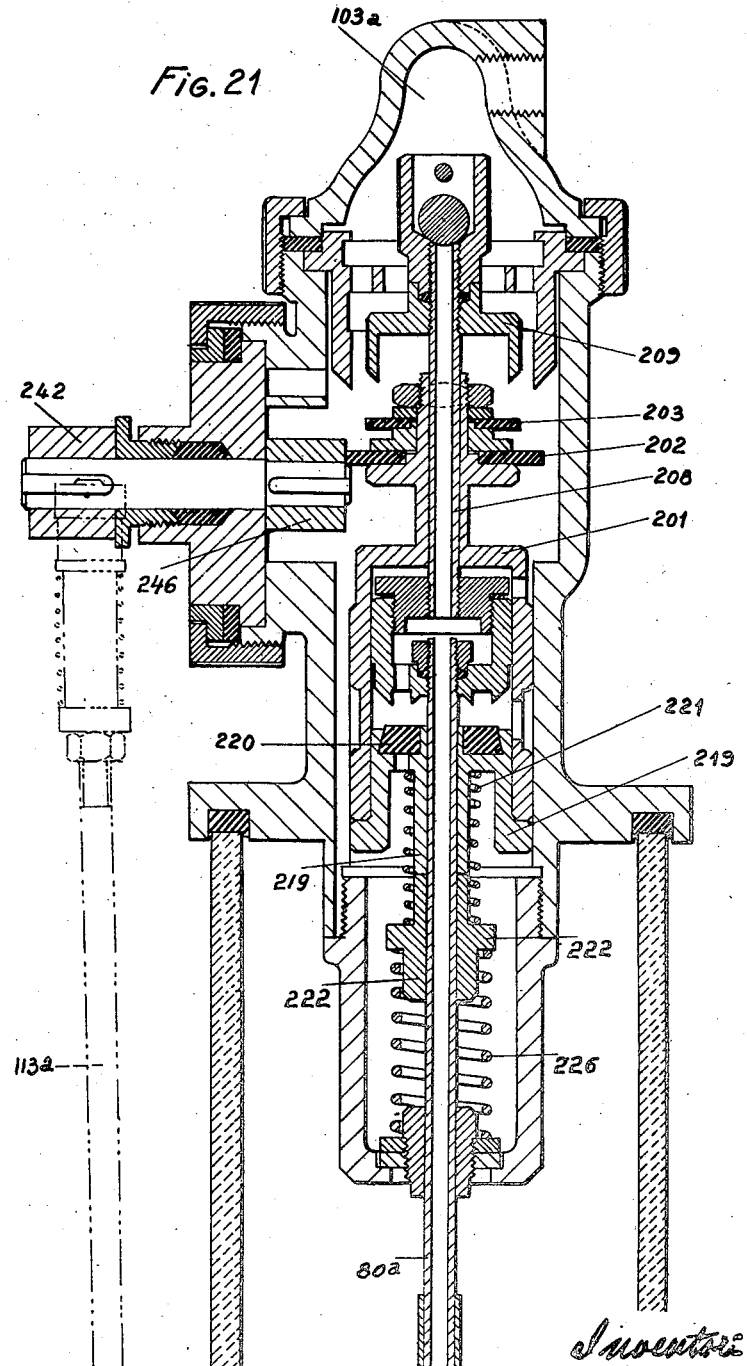
Figures 21 and 22 are similar to Figures 15 and 16 in the position corresponding with the filling of the bottle with liquid.
Figure 22:
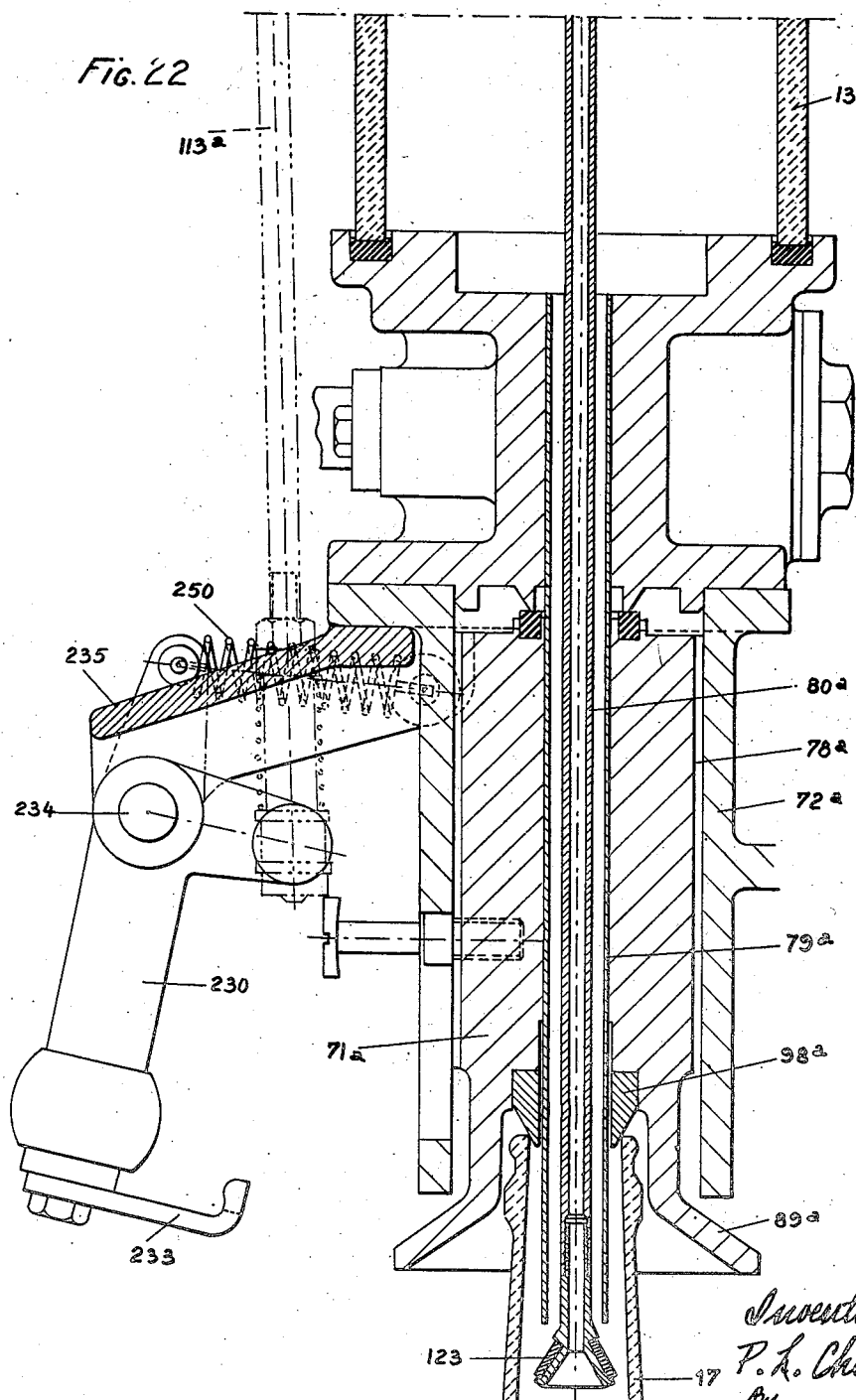
Figure 23:
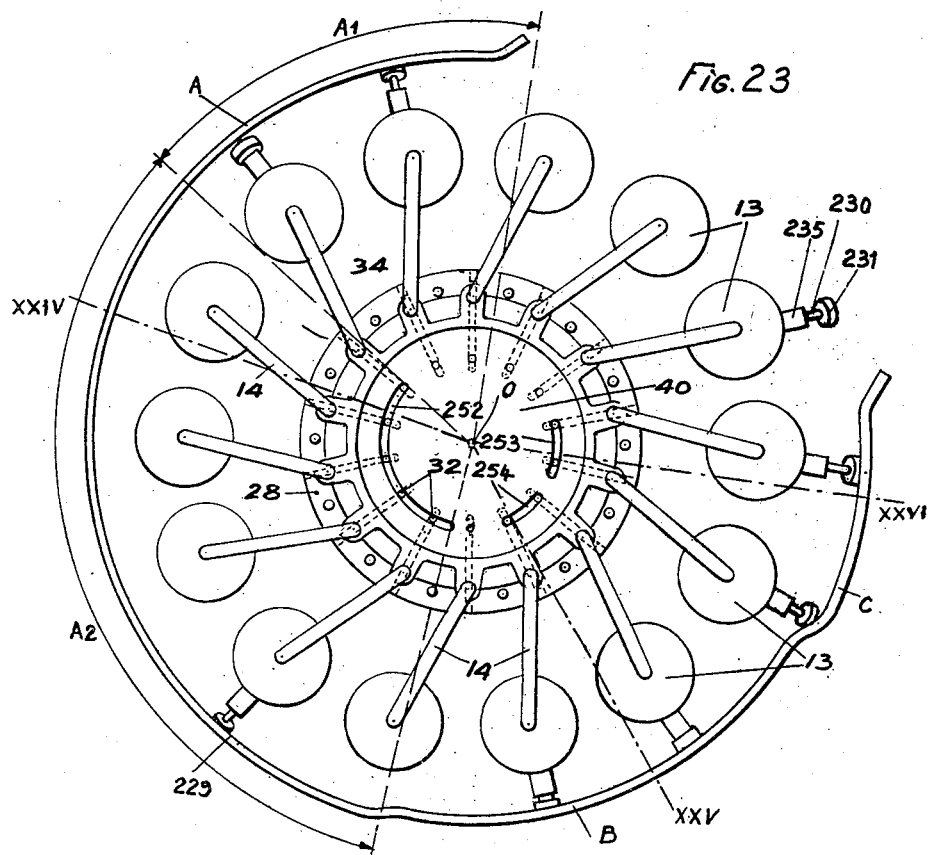
Figure 23 is a plan view of the distributor, the intermediate containers and the control cam, according to the machine illustrated in Fig. 12.

As in the filling machine illustrated in Figure 1, a lowermost filling valve seating 60a is housed below the intermediate container 13 to provide for the filling of the latter with liquid contained in the central collector 7. The lower filling valve is controlled from a camway 65 acting on a follower roller 64 rigid with said valve (Figure 18). The lower valve seating 60a is extended downwardly by a hollow cylindrical body 72a inside which is vertically slidable a tubular element 71a which terminates in the centering funnel 89a and is formed along its external surface with grooves 78a. The yoke 235 is secured under the flange of the body 72a. The tubular element 71a carries a projecting lug 81a terminating in a head portion 251 and slidably engaging a slot 82a formed in the body 72a. The fork 233 is brought into engagement with the lug behind the head 251 thereof, when the tubular element 71a is at its lowermost position (Figure 16), while the funnel 89a in the upward movement thereof releases the finger 81a from the fork 233, thereby enabling the lever 230 to act in accordance with the contour of the circular cam 229 (Figures 18, 20 and 23).

The funnel 89a is provided with a slidable tube 79a and with an abutting seal 75a against an annular seating surface 76a of the valve seating 60a. The tube 89a, coaxial with the tube 79a, supports at its lowermost end a conical obturating plug 123a adapted to seal the annular aperture formed between the tubes 79a and 80a (Figure 18).

The distributor 31 (see Figures 23 to 26), is constructed like the distributor illustrated in Figures 2 and 3 and is distinguished therefrom merely by the fact that the flat annular packing 40a is provided with three arcuate slots 252, 253 and 254 of radius similar to that of the circle along which are distributed the ports 32 of the cover 28. The slot 252 communicates through a duct 50 and a tube 51 with a pipe 52a connecting with the vacuum pump 200. The slots 253 and 254 respectively communicate through ducts 54—55 and 54a—55a formed in the distributor 31 with the carbonic gas conduit 41.

Just as in the machine illustrated in Figure 1, the intermediate containers 13 have a vertical movement imparted thereto from a fixed circular cam 10 rigid with the general frame of the machine.

The operation of the filling machine illustrated in Figures 12 to 26 and the operating process, are as follows:

As the intermediate containers 13 occupy a position vertically above the bottles, due to the action of the control cam 10 (see Figures 15 and 16), the interconnection between them and the central collector 7 is effected through the port 252 (Figures 23 and 24), in such a way as to establish between them a balanced gas pressure. Simultaneously, the lower filling valves of the various intermediate containers 13 are opened under the action of the camway 65, so that in each of said containers the liquid level is the same as in the central collector. The flow of gas arriving at the top of the valve casing 101a is effected through the downward stroke of the piston 201 as the check-valves 202 and 203 are removed from their seats, the gas thus flowing through the holes 207 in the guide 206. Lowering of the piston 201 is produced, at the upward stroke of the container 13, by the engagement of the fork 233 with the head 251 of the lug 81a, the lever 230 being urged back by its release spring 250, thereby acting on the lever 246 through the link 113a. In this way locking of the valves 202 and 203 in removed condition with respect to their seats, is ensured.

Figure 17:
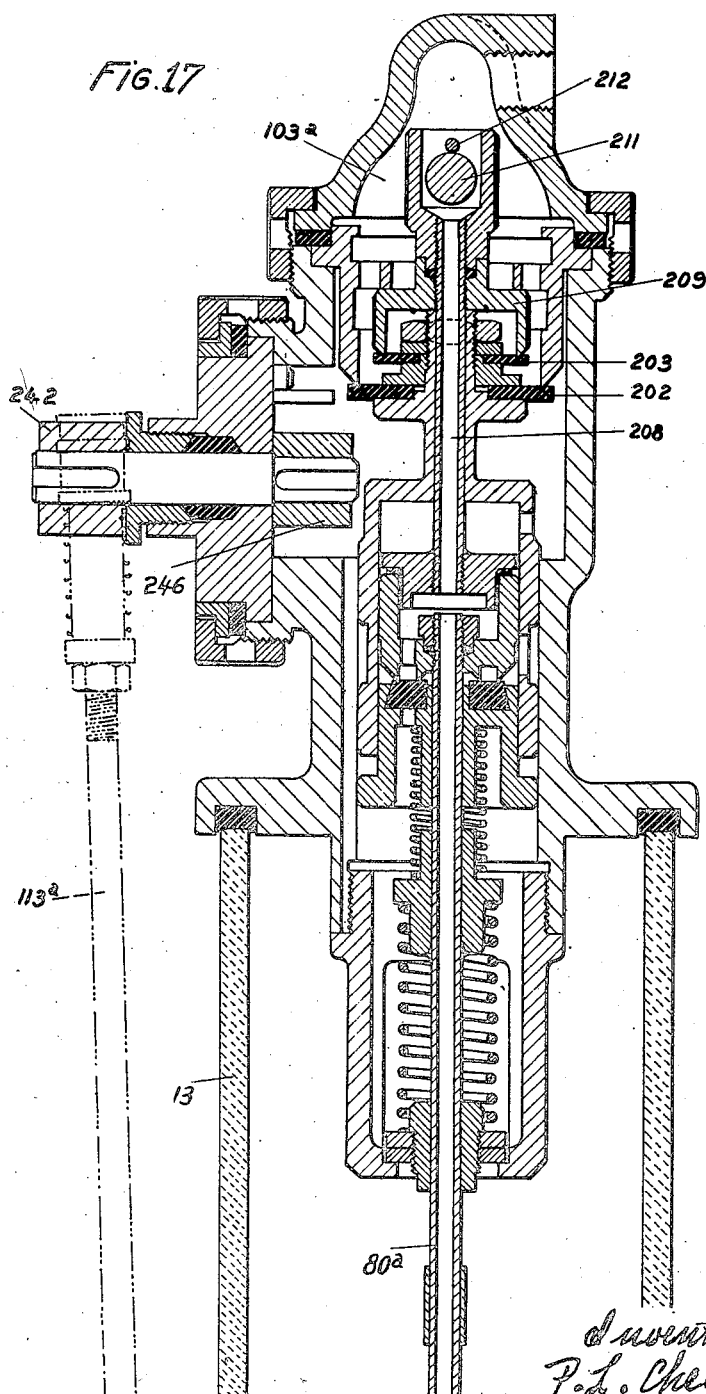
Figures 17 and 18 are similar to Figures 15 and 16 in the position corresponding to the creation of a vacuum in the bottle.

After the filling of the container 13 is completed, said container is presented over the bottle and is lowered on the latter under the action of the control cam 10 (see Figures 1, 17 and 18). The valves 202 and 203 are preliminarily closed, before the bottle has been inserted under the funnel 98a under the action (Figure 23) of the camway B of the cam structure 229 controlling lever 230, link 113a and lever 246 (Figures 17 and 18). At this time, the aperture 32 is opposite the groove 254 and is connected with the vacuum pump 200 through the pipe 52a (Figure 25). The effect of the vacuum raises the ball 211 which is arrested in its upward movement by the pin 212 thereby providing for the flow of air from the bottle to the tube 80a. The air contained in the bottle is then completely drained off (Figures 17 and 18).

The container 13 continuing to revolve, connection between the slot 254 and the aperture 32 is closed. The vacuum is then cut off. It now remains to set up in the bottle a similar gas pressure as in the container 13 before the intake of liquid can be opened. In order to enable the valve member 202, which is subjected at its top to the action of the vacuum and at its bottom to the gas pressure prevailing in the container 13, to be separated from its seat (Figure 19), it is necessary to restore the gas pressure inside the chamber 103a; for this purpose, the connection from the ports 253 to the conducts 54a (Figure 26) and 55a is effected prior to the downward actuation of the piston 201, effected by the cam 229 which through the camway portion C thereof (Figure 23), acts on the lever 246 by means of the lever 230 and the link 113a. During this downward movement, the piston 201 (see Figures 19 and 20) abuts the flange 219 carrying the seal 220. The spring 221 is then compressed, thus enabling the counter-pressure set up in the container 13 to pass through the groove 255 provided in the valve casing 101a and the hole 256 formed in the piston 201 and through the ports 218 of the valve 214 to the interior of the tube 80a and thus into the bottle 17.

Upon the downward movement of the piston 201 proceeding (see Figures 21 and 22), the flange 219 engages the ring 222, causing the seal 123a to open. The arrival of liquid from the container 13 into the bottle is then made possible, thereby filling the latter.

The filling operation having thus been completed, the cam 229 releases the lever 230 which under the action of the spring 250 and through the connection of the rod 113a and the levers 242 and 246 leaves the piston 201 at its initial position (Figure 17) thus closing the various valves 202, 203 and 220.

The container 13 then initiates its upward stroke under control of the control cam 10 (Figure 1). In the first step of this upward stroke, the seal 75a is removed from its seat 76a (Figure 16) to allow the gas chamber formed at the top of the bottle to be slowly relieved of pressure through a slot cut with a suitable tool externally of the tube 79a, and also to allow said chamber to connect with the atmosphere through the grooves 78a formed in the member 71a. During this pressure relief operation, the lever 230 engages the camway A (Figure 23) of the cam structure 229 along the arc A1 (Figure 23).

The above described pressure relief being completed, the container 13 proceeds on its upward movement, and comes completely clear of the bottle and, through the action of the fork 233 against the lug 81a, the piston 201 is again lowered (Figure 15) thereby opening the valves 202 and 203. The cam 229 could then be interrupted along the arc A2 corresponding with the establishment of a counter-pressure in the intermediate container (Figure 23).

What I claim as my invention and desire to secure by Letters Patent is:

1. A bottle filling machine for gaseous liquids comprising a collector filled with liquid and gas, a plurality of filler nozzles, a plurality of intermediate containers each of them being adapted to be connected simultaneously with said collector and with one filler nozzle, means for isolating respectively each intermediate container from said collector and from the corresponding nozzle, means for supplying each intermediate container with liquid and gas from said collector when that one is isolated from the filler nozzle, means for filling each bottle with gas from the corresponding intermediate container through its filler nozzle, said intermediate container communicating with said collector, means for filling each bottle with liquid from the corresponding intermediate container through its filler nozzle when that one is isolated from said collector, means for preventing vitiation of the atmosphere of said collector by the atmosphere of the bottles and means for actuating intermittently and separately said isolating, supplying, filling and preventing means.

2. A bottle filling machine for gaseous liquids comprising a source of gas, a saturator for delivering liquid, a collector having upper and lower ports connected to said source and said saturator, a plurality of filler nozzles, intermediate containers having upper and lower ports and each container being interposed between said collector and one filler nozzle, a plurality of sets of conduits each set of them being adapted to connect the lower and upper ports of the corresponding intermediate container respectively to the lower and upper ports of said collector and to the corresponding filler nozzle, means for closing the conduits of each set of conduits independently from the other conduits, means for actuating intermittently and separately said closing and connecting means so that the supplying of each intermediate container by means of the collector takes place when the corresponding filler nozzle is closed, that the filling of the bottle by gas occurs from said intermediate container while communicating with said collector and that the filling of the bottle by liquid occurs from said intermediate container while isolated from said collector, and means for preventing vitiation of the atmosphere of said collector by the atmosphere of the bottles.

3. A bottle filling machine for gaseous liquids comprising a source of gas, a saturator for delivering liquid, a collector having upper and lower ports connected to said source and said saturator, a plurality of filler nozzles, intermediate containers having upper and lower ports, each container being interposed between said collector and one filler nozzle, a plurality of pairs of inlet tubes each pair of them being adapted to connect the lower and upper ports of the corresponding intermediate container respectively with the lower and upper ports of said collector, a plurality of pairs of outlet tubes each pair of them being adapted to connect the lower and upper ports of the corresponding intermediate container to the corresponding filler nozzle, means for intermittently and separately closing and opening the pairs of inlet tubes, means for closing said upper outlet tube during the first part of the opening of the corresponding upper inlet tubes, means for opening successively each upper outlet tube during the second part of the opening of the corresponding upper inlet tube and during the closing of the same, means for closing and opening the lower outlet tubes when the corresponding lower inlet tubes are respectively operative and inoperative, means for balancing gas pressure in said collector and in each intermediate container, and means for preventing vitiation of the atmosphere of said collector by the atmosphere of the bottles.

4. A bottle filling machine for gaseous liquids comprising a source of gas, a saturator for delivering liquid, a rotatable member having a central collector having upper and lower ports and connected to said source and to said saturator, a plurality of filler nozzles circularly located around the rotation axis of said rotatable member each of them being separately and vertically reciprocable, a support for carrying bottles in vertical alignment with said filler nozzles and, for each filler nozzle, an intermediate container having upper and lower ports supported thereby, two flexible inlet tubes for connecting respectively the lower and the upper ports of said collector and of said intermediate container, two outlet tubes for connecting the lower and upper ports of said intermediate container with said filler nozzle, means for intermittently and separately closing and opening said pair of inlet tubes, means for closing the upper outlet tube during the first part of the opening of the corresponding upper inlet tubes, means for opening successively each upper outlet tube during the second part of the opening of the corresponding upper inlet tube and during the closing of the same, means for closing and opening the lower outlet tube when the corresponding lower inlet tube is respectively operative and inoperative, means for balancing gas pressure in said collector and in said container, means for actuating said closure and opening means, means for driving said rotatable member, means for vertically reciprocating said filler nozzles provided with their corresponding intermediate containers and means for preventing vitiation of the atmosphere of said collector by the atmosphere of the bottles.

5. A bottle filling machine for gaseous beverages, according to claim 4, and wherein the gas delivered from the source of gas is carbonic acid gas and the liquid contained in the saturator is a beverage.

6. A bottle filling machine for gaseous liquids, according to claim 4, and wherein the means for preventing vitiation of the collector atmosphere comprises means for connecting each intermediate container with the surrounding atmosphere and means for actuating said connecting means when the atmosphere of said intermediate container is connected to the atmosphere of the collector while isolated from the filler nozzle and when the liquid flows into the bottle, so that the air and gas mixture contained in said bottle is delivered into said intermediate container to thereafter escape to the surrounding atmosphere.

7. A bottle filling machine for gaseous liquids, according to claim 4, and wherein the means for preventing vitiation of the collector atmosphere comprises means for connecting intermittently and separately from the closure of the pairs of inlet tubes the corresponding intermediate containers with surrounding atmosphere and, when each pair of inlet tubes is closed, means for blowing through the air and gas mixture contained in the corresponding bottle within the corresponding intermediate container through the associated pair of outlet tubes and means for delivering said mixture from said container into surrounding atmosphere.

8. A bottle filling machine for gaseous liquids, according to claim 4, and wherein the means for preventing vitiation of the collector atmosphere comprises means for blowing through the air and gas mixture contained in the bottle within the corresponding intermediate container through the pair of outlet tubes, when the pair of inlet tubes is closed, means for delivering said mixture from said container into surrounding atmosphere, means for connecting intermittently and separately from the closure of said pair of inlet tubes the corresponding intermediate container with surrounding atmosphere, and means for actuating said blowing through means said delivering means and said connecting means.

9. A bottle filling machine for gaseous liquids, according to claim 4, and wherein the means for preventing vitiation of the collector atmosphere comprises a source of vacuum, means for connecting each bottle with said source of vacuum and means for actuating said connecting means before the filling of said bottle with gas, when the pair of inlet tubes is closed.

10. A bottle filling machine for gaseous liquids, according to claim 4, and wherein the means for closing the upper inlet tubes, for actuating said closing means and for balancing gas pressure comprise a central distributor adapted to place the atmosphere of the intermediate containers into communication alternately with the surrounding atmosphere and the atmosphere of the central collector and means for rendering said distributor operative.

11. A bottle filling machine for gaseous liquids, according to claim 4, and wherein the means for preventing vitiation of the collector atmosphere comprises a source of vacuum, means for connecting each bottle with said source of vacuum and means for actuating said connecting means before the filling of said bottle with gas, when the pair of inlet tubes is closed, and wherein the means for closing the upper inlet tubes, for actuating said closing means and for balancing gas pressure comprise a central distributor adapted to place the atmosphere of the intermediate containers only into communication alternately with the atmosphere of the central collector and means for rendering said distributor operative.

12. A bottle filling machine for gaseous liquids, according to claim 4, and wherein the means for closing the upper inlet tubes, for actuating said closing means and for balancing gas pressure comprise a cover having ports fixed on the collector provided with a central aperture and radial blind channels discharging at the upper outer surface of said cover through two ports, each of them being spaced along different circles coaxial with the axis of rotation of said rotatable member and one of them being connected to the inlet upper tube of the corresponding intermediate container, a stationary central distributor having a central duct connected with the source of gas and upper and lower orifices, a conduit discharging at the lower and upper surface of said distributor through said orifices, the upper orifice being connected to the surrounding atmosphere and the lower orifice being located on a radius similar to that of the circle on which extend the ports of said cover, and a channel connected to said central duct and discharging at the lower surface of said distributor through ports registering with the ports of said cover, a flat annular packing interposed between the upper face of said cover and the lower face of said distributor and provided with two arcuate slots one of them for connecting the conduit lower orifice of said distributor with ports of said cover and the other for connecting the channel lower port of said distributor with ports of said cover, and means for resiliently urging said distributor against said cover.

13. A bottle filling machine for gaseous liquids, according to claim 4, and wherein the means for preventing vitiation of the collector atmosphere comprises a source of vacuum, means for connecting each bottle with said source and means for actuating said connecting means before the filling of said bottle with gas, when the pair of inlet tubes is closed, and wherein the means for closing the upper inlet tubes, for actuating said closing means and for balancing gas pressure comprise a cover fixed on the collector provided with ports and a central aperture and radial blind channels discharging at the upper outer surface of said cover through two said ports each of them being spaced along different circles coaxial with the axis of rotation of said rotatable member and one of them being connected to the inlet upper tube of the corresponding intermediate container, a stationary central distributor having an upper and a lower orifice and a central duct connected with the source of gas, a conduit discharging at the lower and upper surfaces of said distributor through one said orifice, the upper orifice being connected to said source of vacuum and the lower orifice being located on a radius similar to that of the circle on which extend the free upper ports of said cover, and two channels located on both sides of said conduit, connected to said central duct and each discharging at the lower surface of said distributor through ports registering with the upper free ports of said cover, a flat annular packing interposed between the upper face of said cover and the lower face of said distributor and provided with three arcuate slots the central of them for connecting the conduit lower orifice of said distributor with ports of said cover and the others for connecting the channel lower ports of said distributor with ports of said cover, and means for resiliently urging said distributor against said cover.

14. A bottle filling machine for gaseous liquids, according to claim 4, and wherein the means for closing the lower inlet tubes and for actuating said closing means comprise check-valves interposed between said tubes and the intermediate containers for normally closing said tube, slidable members carried by the filler nozzle, a fixed cam for reciprocating said slidable members and a fixed cam surface adapted to open successively said valves when vertically located opposite said cam.

15. A bottle filling machine for gaseous liquids, according to claim 4, and wherein the outlet tubes are straight vertical concentrical tubes and wherein the means for closing and opening said outlet tubes and for actuating said closing and operating means comprise a centering funnel surrounding the lower ends of said tubes and vertically reciprocable under the action of the neck of the bottle to be filled, a first check-valve for closing and opening the upper outlet tube, a second check-valve for closing and opening the lower outlet tube, means for controlling the closing and opening of said check-valves by the vertical reciprocation of said centering funnel so that the first check-valve is opened before opening of the second check-valve and means for closing the lower annular aperture between outlet tubes when no bottle is present.

16. A bottle filling machine for gaseous liquids, according to claim 4, and wherein the outlet tubes are straight vertical concentrical tubes, the upper outlet tube being open at each end and wherein the means for preventing vitiation of the collector atmosphere, the means for closing and opening said outlet tubes and for actuating said preventing, closing and operating means comprise a source of vacuum, a pipe located above and opposite to the upper outlet tube adapted to be connected to said source, a first check-valve for closing and opening the connection between said upper outlet tube and the upper port of the intermediate container, a second check-valve for closing and opening the connection between the upper port of the intermediate container with the upper inlet tube, means for connecting said pipe with said source of vacuum when said check-valves are simultaneously closed, means for opening the lower annular aperture between said outlet tubes, a centering funnel surrounding the lower ends of said tubes and vertically reciprocable under the action of the neck of the bottle to be filled and means for controlling the operation of said check-valves and of said connecting and opening means so that successively said intermediate container is filled with gas from the collector, said bottle is blown through by vacuum, then filled with gas from said intermediate container connected to said collector and lastly filled with liquid from said intermediate container the connection of which with said collector is then interrupted.

17. A bottle filling machine for gaseous liquids, according to claim 4, and wherein the outlet tubes are straight vertical concentrical tubes, the lower outlet tube managing an annular space round the upper outlet tube, and wherein the means for closing and opening said outlet tubes and for actuating said closing and operating means comprise a centering funnel, loosely secured to said lower outlet tube, provided with peripheral channels and inwardly projecting guiding means for guiding said lower outlet tube, and being vertically reciprocable under the action of the neck of the bottle to be filled, a casing for guiding externally said funnel provided with its guiding means, a first check-valve for closing and opening the upper outlet tube, a second check-valve for closing and opening the lower outlet tube, a movable cam for generating the strokes of said check-valves so that the first check-valve is opened before opening of the second check-valve, means for controlling said movable cam under the vertical reciprocation of said centering funnel and means for closing the lower annular aperture between outlet tubes when no bottle is present.

18. A bottle filling machine for gaseous liquids, according to claim 4, and wherein the outlet tubes are straight spaced vertical concentrical tubes, the upper outlet tube being open at each end, and wherein the means for preventing vitiation of the collector atmosphere, the means for closing and opening said outlet tubes and for actuating said preventing, closing and operating means comprise a source of vacuum, a pipe located above and opposite to the upper outlet tube adapted to be connected to said source, a first check-valve for closing and opening the connection between said upper outlet tube and the upper port of the intermediate container, a second check-valve for closing and opening the connection between the upper port of the intermediate container with the upper inlet tube, means for connecting said pipe with said source of vacuum when said check-valves are simultaneously closed, means for opening a lower annular aperture between said outlet tubes, a centering funnel, secured loosely to said lower outlet tube, provided with peripheral channels and inwardly projecting guiding means for guiding said lower outlet tube, and being vertically reciprocable under the action of the neck of the bottle to be filled, a casing carried by said intermediate container and provided with a slot and adapted to guide externally said funnel provided with its guiding means, means for controlling the operation of said check-valves and of said connecting and opening means and a circular cam provided with three different, uniform and successive tracts, interrupted between the third and the first tracts and adapted to actuate said controlling means so that for the first, portion of the first tract the first check-valve and said peripheral channels are open, that for the second portion of said first tract the first check-valve alone is open, that for the second tract the check-valves are closed and the connecting means for said pipe is operative, that for the third tract both check-valves are open and that during the interruption of said cam the means for opening the lower annular aperture between said outlet tubes is operative.

19. A bottle filling machine for gaseous liquids, according to claim 4, and wherein the outlet tubes are straight spaced vertical concentrical tubes, the upper outlet tube being open at each end, and wherein the means for preventing vitiation of the collector atmosphere, the means for closing and opening said outlet tubes and for actuating said preventing, closing and operating means comprise a source of vacuum, a pipe located above and opposite to the upper outlet tube adapted to be connected to said source, a first check-valve for closing and opening the connection between said upper outlet tube and the upper port of the intermediate container, a second check-valve for closing and opening the connection between the upper port of the intermediate container with the upper inlet tube, means for connecting said pipe with said source of vacuum when said check-valves are simultaneously closed, means for opening a lower annular aperture between said outlet tubes, a centering funnel, secured loosely to said lower outlet tube, provided with peripheral channels and inwardly projecting guiding means for guiding said lower outlet tube, and vertically reciprocable under the action of the neck of the bottle to be filled, a casing carried by said intermediate container and provided with a slot and adapted to guide externally said funnel provided with its guiding means, a lug carried by said funnel and projecting outwardly through said slot, a lever pivotally mounted on said casing and provided with a fork adapted to engage said lug when said funnel is inoperative, a spring connected to said lever for urging said fork from said lug, means for controlling the operation of said check-valves and of said connecting and opening means by the angular position of said lever and a circular cam provided with three different, uniform and successive tracts, interrupted between the third and the first tracts and adapted to control said lever against said release spring so that for the first portion of the first tract said first check-valve and said peripheral channels are open, that for the second portion of said first tract the first check-valve alone is open, that for the second tract the check-valves are closed and the connecting means of said pipe is operative, that for the third tract both check-valves are open and that during the interruption of said cam the means for opening the lower annular aperture between said outlet tubes is operative.

20. A bottle filling machine for gaseous liquids, according to claim 4, and wherein the outlet tubes are straight spaced vertical concentrical tubes, the upper outlet tube being open at each end, and wherein the means for preventing vitiation of the collector atmosphere, the means for closing and opening said outlet tubes and for actuating said preventing, closing and operating means comprise a source of vacuum, a pipe located above and opposite to the upper outlet tube adapted to be connected to said source, a first check-valve for closing and opening the connection between said upper outlet tube and the upper port of the intermediate container, a second check-valve for closing and opening the connection between the upper port of the intermediate container with the upper inlet tube, means for connecting said pipe with said source of vacuum when said check-valves are simultaneously closed, means for opening a lower annular aperture between said outlet tubes, a centering funnel, secured loosely to said lower outlet tube, provided with peripheral channels and inwardly projecting guiding means for guiding said lower outlet tube, and vertically reciprocable under the action of the neck of the bottle to be filled, a casing carried by said intermediate container and provided with a slot and adapted to guide externally said funnel provided with its guiding means, means for controlling the operation of said check-valves and of said connecting and opening means and a circular cam provided with three different and uniform tracts, interrupted between the first and the second tracts and between the third and the first tracts and adapted to actuate said controlling means so that for the first tract said first check-valve and said peripheral channels are open, that for said first interruption the first check-valve alone is open, that for the second tract the check-valves are closed and the connecting means of said pipe is operative, that for the third tract both check-valves are open and that during the second interruption of said cam the means for opening the lower annular aperture between said outlet tubes is operative.

21. A bottle filling machine for gaseous liquids comprising a source of gas, a saturator for delivering liquid, a rotatable member having a central collector with upper and lower ports connected to said source and to said saturator, a plurality of filler nozzles circularly located around the rotation axis of said rotatable member each of them being separately and vertically reciprocable, a support for carrying bottles in vertical alignment with said filler nozzles and, for each filler nozzle, an intermediate container having upper and lower ports supported thereby, two flexible inlet tubes for connecting respectively the lower and upper ports of said collector and of said intermediate container, two outlet tubes for connecting the lower and upper ports of said intermediate container with said filler nozzle, means for intermittently and separately closing and opening said pair of inlet tubes, means for closing the upper outlet tube during the first part of the opening of the corresponding upper inlet tubes, means for opening successively each upper outlet tube during the second part of the opening of the corresponding upper inlet tube and during the closing of the same, means for closing and opening the lower outlet tube when the corresponding lower inlet tube is respectively operative and inoperative, means for balancing gas pressure in said collector and in said container, and, when said pair of inlet tubes is closed, means for blowing through the air and gas mixture contained in the corresponding bottle within said intermediate container through said pair of outlet tubes and means for delivering said mixture from said container into surrounding atmosphere, means for connecting intermittently and separately from the closure of said pair of inlet tubes the corresponding intermediate containers with surrounding atmosphere, means for actuating said closing and opening means, means for driving said rotatable member, means for vertically reciprocating said filler nozzles provided with their corresponding intermediate containers, the blowing through means of the bottle being adapted to act in advance with respect to the end of filling of said bottle and the means for opening the lower inlet tube being adapted to be retarded with respect to the operation of the means for opening the upper inlet tube.

22. A bottle filling machine for gaseous beverages, according to claim 21, and wherein the gas delivered from the source of gas is carbonic acid gas and the liquid contained in the saturator is a beverage.

23. A bottle filling machine for gaseous liquids comprising a source of gas, a saturator for delivering liquid, a rotatable member having a central collector with upper and lower ports connected to said source and to said saturator, a plurality of filler nozzles circularly located around the rotation axis each of them being separately and vertically reciprocable, a support for carrying bottles in vertical alignment with said filler nozzles and, for each filler nozzle, an intermediate container having upper and lower ports supported thereby, two flexible inlet tubes for connecting respectively the lower and upper ports of said collector and of said intermediate container, two outlet tubes for connecting the lower and upper ports of said intermediate container with said filler nozzle, means for intermittently and separately closing and opening said pair of inlet tubes, means for closing the upper outlet tube during the first part of the opening of the corresponding upper inlet tubes, means for opening successively each of the upper outlet tubes during the second part of the opening of the corresponding upper inlet tube and during the closing of the same, means for closing and opening the lower outlet tube when the corresponding lower inlet tube is respectively operative and inoperative, means for balancing gas pressure in said collector and in said container, a source of vacuum, means for connecting each bottle with said source, means for actuating said connecting means before the filling of said bottle with gas, when the pair of inlet tubes is closed, means for actuating said closing and opening means, means for driving said rotatable member, means for vertically reciprocating said filler nozzles provided with their corresponding intermediate containers, the means for opening the upper inlet tube being adapted to act in advance with respect to the means for opening the upper outlet tube when vacuum is established in the bottle.

24. A bottle filling machine for gaseous beverages, according to claim 23, and wherein the gas delivered from the source of gas is carbonic acid gas and the liquid contained in the saturator is a beverage.

PAUL LOUIS CHELLE.

No references cited.